United States Patent
Löfving et al.

(10) Patent No.: US 11,541,457 B2
(45) Date of Patent: *Jan. 3, 2023

(54) DEVICES, SYSTEMS, AND METHODS FOR MONITORING A POWDER LAYER IN ADDITIVE MANUFACTURING PROCESSES

(71) Applicant: ARCAM AB, Moelndal (SE)

(72) Inventors: Björn Löfving, Vastra Gotaland (SE); Kristofer Karlsson, Kungsbacka (SE)

(73) Assignee: Arcam AB, Moelndal (SE)

( * ) Notice: Subject to any disclaimer, the term of this patent is extended or adjusted under 35 U.S.C. 154(b) by 516 days.

This patent is subject to a terminal disclaimer.

(21) Appl. No.: 16/523,484

(22) Filed: Jul. 26, 2019

(65) Prior Publication Data

US 2021/0023617 A1  Jan. 28, 2021

(51) Int. Cl.
*B29C 67/00* (2017.01)
*B22F 10/00* (2021.01)
(Continued)

(52) U.S. Cl.
CPC ............ *B22F 10/00* (2021.01); *B29C 64/153* (2017.08); *G06V 10/25* (2022.01); *B22F 10/10* (2021.01); *B33Y 30/00* (2014.12); *B33Y 50/02* (2014.12)

(58) Field of Classification Search
CPC ........ B22F 10/00; B22F 10/10; B29C 64/153; B33Y 10/00; B33Y 30/00; B33Y 50/00; B33Y 50/02
See application file for complete search history.

(56) References Cited

U.S. PATENT DOCUMENTS 6,930,278 B1   8/2005  Chung et al.
7,537,722 B2   5/2009  Andersson et al.
(Continued)

FOREIGN PATENT DOCUMENTS

CN   107807568 A   3/2018
CN   108283008 A   7/2018
(Continued)

OTHER PUBLICATIONS

European Extended Search Report for EP Application No. 20186476.6 dated Oct. 2, 2020 (15 pages).
(Continued)

*Primary Examiner* — Ryan M Ochylski
(74) *Attorney, Agent, or Firm* — Dinsmore & Shohl LLP

(57) ABSTRACT

Devices, systems, and methods for monitoring a powder layer in additive manufacturing are disclosed. A method of monitoring a powder layer includes receiving image data corresponding the powder layer supported by a powder bed within a build chamber from imaging devices, determining leading and trailing regions of interest located adjacent to a leading end and a trailing end of the moving powder distributor, respectively, the leading and trailing regions of interest moving according to movement of the moving powder distributor, selecting at least one point located in the leading region of interest from the image data, determining first characteristics of the point, when the point is located within the trailing region of interest, determining second characteristics of the point, and comparing the first characteristics to the second characteristics.

8 Claims, 12 Drawing Sheets

(51) Int. Cl.
  *B29C 64/153* (2017.01)
  *G06V 10/25* (2022.01)
  *B33Y 30/00* (2015.01)
  *B33Y 50/02* (2015.01)
  *B22F 10/10* (2021.01)

(56) References Cited

U.S. PATENT DOCUMENTS

| | | | |
|---|---|---|---|
| 7,833,465 | B2 | 11/2010 | Larsson |
| 8,308,466 | B2 | 11/2012 | Ackelid et al. |
| 9,399,321 | B2 | 7/2016 | Ljungblad |
| 9,573,193 | B2 | 2/2017 | Buller et al. |
| 9,662,840 | B1 | 5/2017 | Buller et al. |
| 9,718,129 | B2 | 8/2017 | Ljungblad et al. |
| 9,757,760 | B2 | 9/2017 | Halder et al. |
| 10,189,114 | B2 | 1/2019 | Stecker |
| 11,338,519 | B2 * | 5/2022 | Löfving ............... B29C 64/245 |
| 2014/0329953 | A1 | 11/2014 | Paternoster |
| 2015/0268099 | A1 | 9/2015 | Craig et al. |
| 2015/0323318 | A1 | 11/2015 | Hess et al. |
| 2017/0113449 | A1 | 4/2017 | Haupt et al. |
| 2018/0001563 | A1 | 1/2018 | Frohnmaier et al. |
| 2018/0120260 | A1 | 5/2018 | Goldfine et al. |
| 2018/0169948 | A1 | 6/2018 | Coeck et al. |
| 2018/0264590 | A1 | 9/2018 | Goldfine et al. |
| 2018/0370146 | A1 | 12/2018 | Domrose et al. |

FOREIGN PATENT DOCUMENTS

| | | |
|---|---|---|
| CN | 109874322 A | 6/2019 |
| DE | 102016207059 A1 | 10/2017 |
| EP | 2942130 A1 | 11/2015 |
| WO | 9511100 A | 4/1995 |
| WO | 2011008143 | 1/2011 |
| WO | 2016142552 | 9/2016 |
| WO | 2017160299 | 9/2017 |
| WO | 2018186872 | 10/2018 |

OTHER PUBLICATIONS

Chinese Patent Application No. 202010723777.6 Office Action, dated May 9, 2022 (25 pages with English Translation).

* cited by examiner

DEVICES, SYSTEMS, AND METHODS FOR MONITORING A POWDER LAYER IN ADDITIVE MANUFACTURING PROCESSES

FIELD

The present disclosure relates to devices, systems, and methods for monitoring a powder layer in additive manufacturing processes, and more specifically, for collecting image data pertaining to the powder layer before and after a powder distributor has passed over the powder layer.

BACKGROUND

In additive manufacturing processes, particularly those that utilize electron-beam melting of a powder layer to create an article, it may be necessary to ensure a uniform powder for accurate article creation. A powder distributor may be used to more uniformly distribute the powder layer, but sometimes distribution may not be complete after passing the powder distributor over the powder layer. Thus, it may be necessary to determine whether the powder layer is sufficiently distributed after passing of the powder distributor over the powder layer, as well as various locations of uneven powder distribution such that the powder distributor can make subsequent passes over the locations to evenly distribute the powder.

SUMMARY

In a first aspect A1, a method of monitoring a powder layer distributed by a moving powder distributor in a build chamber. The method includes receiving, by a processing device, image data corresponding to a plurality of images of the powder layer supported by a powder bed within the build chamber from one or more imaging devices positioned to image the powder bed. The method further includes determining, by the processing device, a leading region of interest located adjacent to a leading end of the moving powder distributor. The leading region of interest moves according to movement of the moving powder distributor. The method further includes determining, by the processing device, a trailing region of interest located adjacent to a trailing end of the moving powder distributor. The trailing region of interest moves according to the moving powder distributor. The method further includes selecting, by the processing device, at least one point located in the leading region of interest from the image data. The method further includes determining, by the processing device, one or more first characteristics of the at least one point. The method further includes, when the at least one point is located within the trailing region of interest due to movement of the moving powder distributor, determining, by the processing device, one or more second characteristics of the at least one point. The method further includes comparing, by the processing device, the one or more first characteristics of the at least one point to the one or more second characteristics of the at least one point to monitor the powder layer distributed by the moving powder distributor.

A second aspect A2 includes the method of first aspect A1, wherein receiving the image data includes receiving a radiation map corresponding to an amount of radiation emitted from the powder layer.

A third aspect A3 includes the method of any of the first-second aspects A1-A2, wherein receiving the image data includes receiving a time stamp corresponding to a time at which the plurality of images of the powder layer were captured relative to movement of the moving powder distributor.

A fourth aspect A4 includes the method of any of the first-third aspects A1-A3, wherein receiving the image data includes receiving leading image data from a first imaging device and receiving trailing image data from a second imaging device, the leading image data including the leading region of interest and the trailing image data including the trailing region of interest.

A fifth aspect A5 includes the method of any of the first-fourth aspects A1-A4, further including, prior to determining the leading region of interest, the method further includes identifying, by the processing device, the moving powder distributor from the image data.

A sixth aspect A6 includes the method of any of the first-fifth aspects A1-A5, further including providing feedback to one or more components of the build chamber based on the comparing.

A seventh aspect A7 includes the method of any of the first-sixth aspects A1-A7, further including directing movement of the moving powder distributor based on the comparing.

An eighth aspect A8 includes the method of any of the first-seventh aspects A1-A7, further including determining one or more powder defects based on the comparing.

A ninth aspect A9 includes the method of any of the first-third aspects A1-A3 or fifth-eighth aspects A5-A8, wherein the leading region of interest and the trailing region of interest are a portion of the field of view of the one or more imaging devices.

In a tenth aspect A10, an additive manufacturing system includes a build chamber having a powder distributor and a powder bed. The powder bed supports a powder layer thereon. The powder distributor is movable over the powder bed to distribute the powder layer. The additive manufacturing system further includes an imaging device positioned adjacent to the build chamber such that a field of view of the imaging device encompasses the powder bed. The additive manufacturing system further includes a control component communicatively coupled to the imaging device. The control component is configured to receive image data from the imaging device, determine a leading region of interest adjacent to a leading end of the powder distributor and a trailing region of interest adjacent to a trailing end of the powder distributor in the image data, select at least one point in the leading region of interest, determine one or more first characteristics of the at least one point, determine one or more second characteristics of the at least one point when the powder distributor moves such that the at least one point is located within the trailing region of interest, and compare the one or more first characteristics with the one or more second characteristics to monitor the powder layer.

An eleventh aspect A11 includes the additive manufacturing system of tenth aspect A10, wherein the imaging device is an area scan camera.

A twelfth aspect A12 includes the additive manufacturing system of eleventh aspect A11, wherein the area scan camera includes a monochrome sensor.

A thirteenth aspect A13 includes the additive manufacturing system of eleventh aspect A11, the area scan camera includes a color sensor and a Bayer filter.

A fourteenth aspect A14 includes the additive manufacturing system of one of tenth-thirteenth aspects A10-A13, wherein the imaging device detects radiation reflected off the powder layer and the image data includes a radiation map.

A fifteenth aspect A15 includes the additive manufacturing system of one of tenth-fourteenth aspects A10-A14, the control component is further configured to determine one or more defects of the powder layer based on the comparing.

In a sixteenth aspect A16, an additive manufacturing system includes a build chamber having a powder distributor and a powder bed. The powder bed supports a powder layer thereon and the powder distributor is movable over the powder bed to distribute the powder layer. The additive manufacturing system further includes a dynamic optical element positioned adjacent to the build chamber and a plurality of imaging devices positioned adjacent to the build chamber and optically coupled to the dynamic optical element such that a field of view of a first imaging device of the plurality of imaging devices is directed towards a leading region of interest located adjacent to a leading end of the powder distributor and such that a field of view of a second imaging device of the plurality of imaging devices is directed towards a trailing region of interest located adjacent to a trailing end of the powder distributor. The additive manufacturing system further includes a control component communicatively coupled to each of the plurality of imaging devices, the control component configured to receive image data from the plurality of imaging devices, select at least one point in the leading region of interest, determine one or more first characteristics of the at least one point, determine one or more second characteristics of the at least one point when the powder distributor moves such that the at least one point is located within the trailing region of interest, and compare the one or more first characteristics with the one or more second characteristics to monitor the powder layer.

A seventeenth aspect A17 includes the additive manufacturing system of sixteenth aspect A16, wherein at least one of the plurality of imaging devices is a hyperspectral line scan camera.

An eighteenth aspect A18 includes the additive manufacturing system of one of sixteenth-seventeenth aspects A16-A17, wherein the dynamic optical element comprises at least one of a rotating mirror, a MEMS mirror, a lens, and a prism.

A nineteenth aspect A19 includes the additive manufacturing system of one of sixteenth-eighteenth aspects A16-A18, wherein the imaging devices detect radiation reflected off the powder layer and the image data comprises a radiation map.

A twentieth aspect A20 includes the additive manufacturing system of one of sixteenth-nineteenth aspects A16-A19, wherein the control component is further configured to determine one or more defects of the powder layer based on the comparing.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to devices, systems, and methods that monitor the distribution of a powder layer supported by a powder bed in a build chamber of additive manufacturing system immediately before and after a powder distributor is passed over the powder layer to distribute the powder. Such devices, systems, and methods use one or more particularly configured imaging devices to achieve effective monitoring of the powder layer. Such monitoring is necessary for the purposes of ensuring that the powder layer supported by the powder bed is adequately distributed prior to application of an energy beam to form a cross section of an article. Without adequate distribution, the article may not be appropriately formed.

Figure 1A:
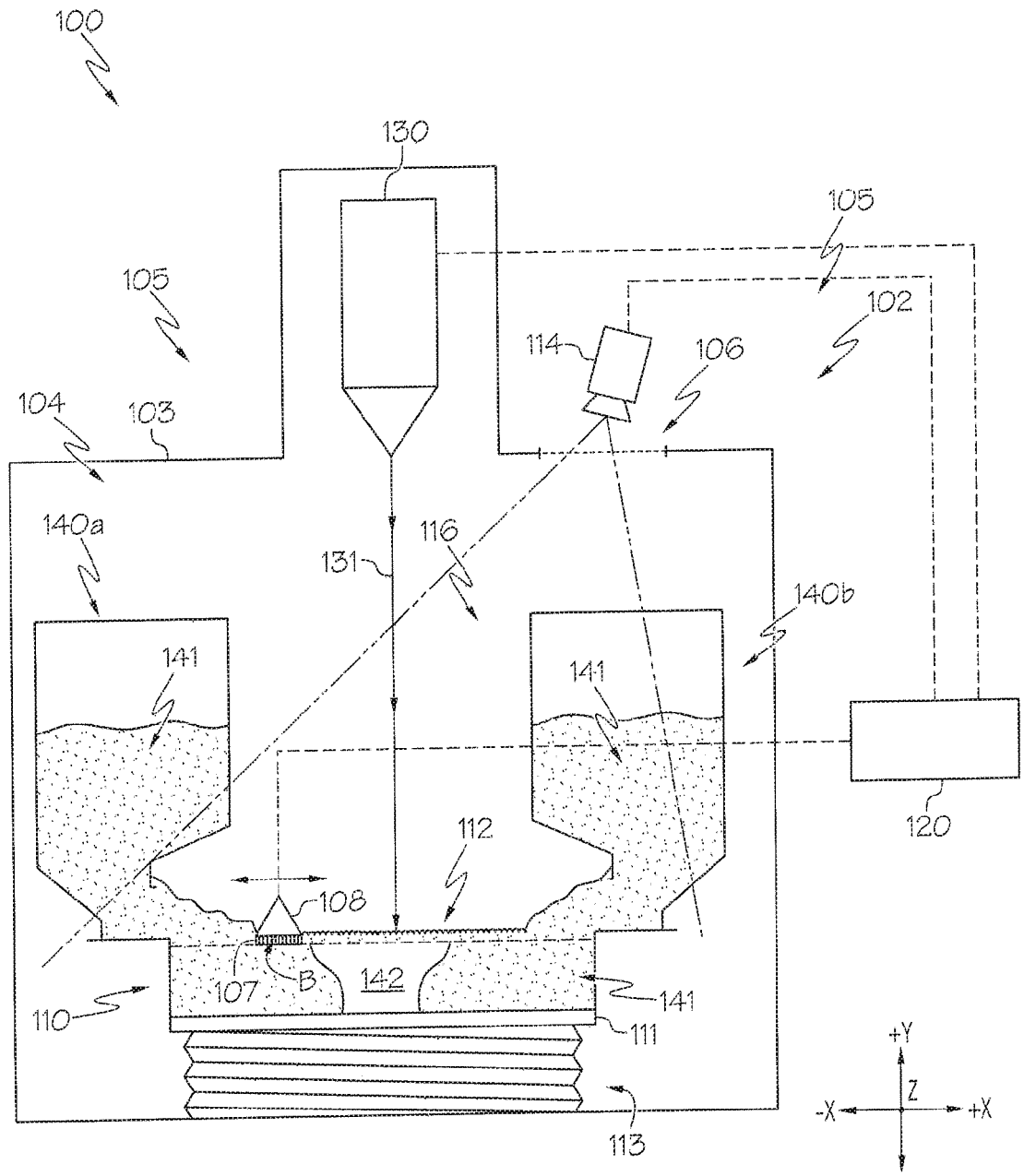
FIG. 1A schematically depicts a cutaway side view of an illustrative additive manufacturing system including an imaging device having a field of view that encompasses an entirety of a powder bed according to one or more embodiments shown and described herein.
Figure 1B:
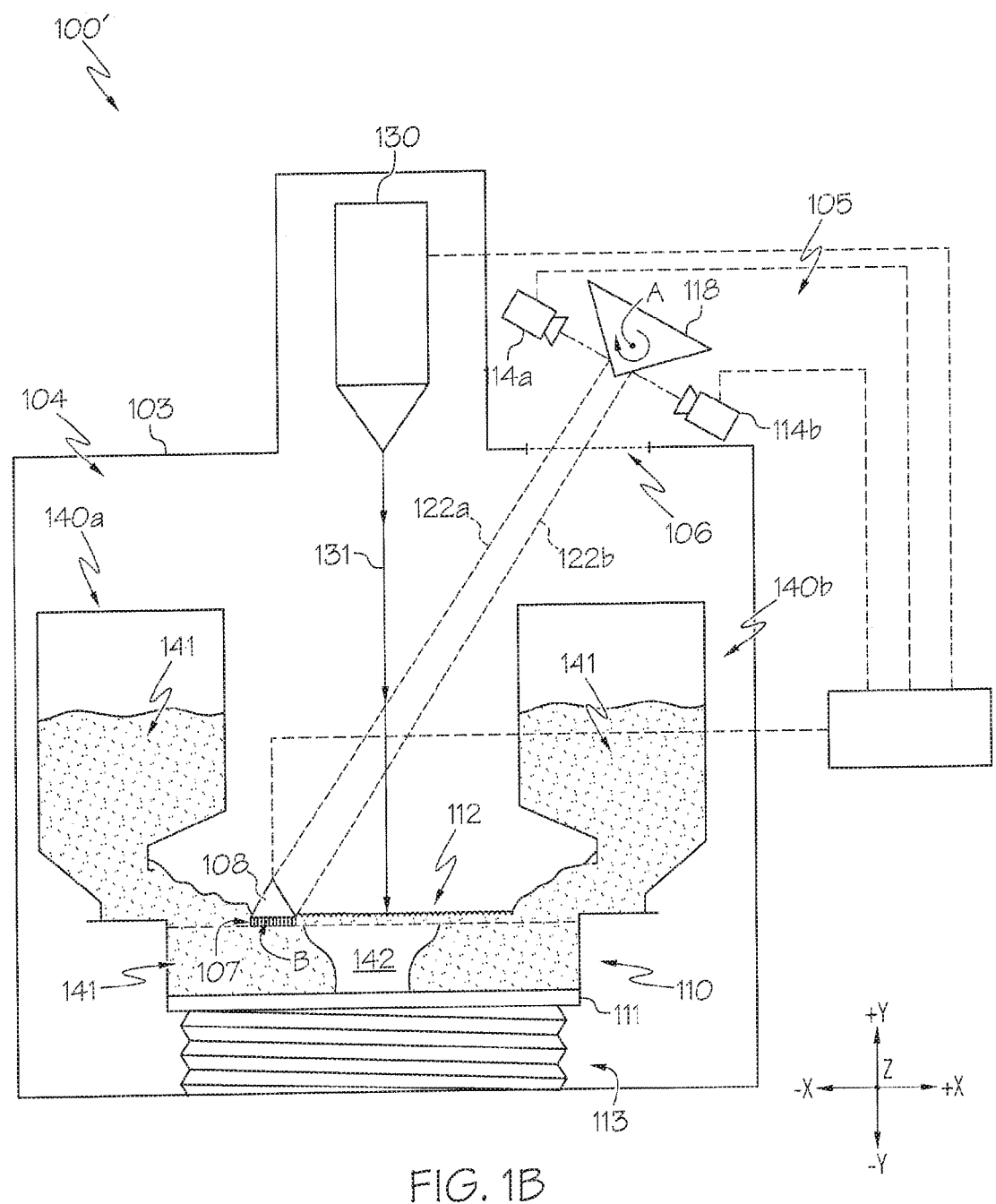
FIG. 1B schematically depicts a cutaway side view of an illustrative additive manufacturing system including a plurality of imaging devices optically coupled to a dynamic optical element according to one or more embodiments shown and described herein.
Figure 1C:
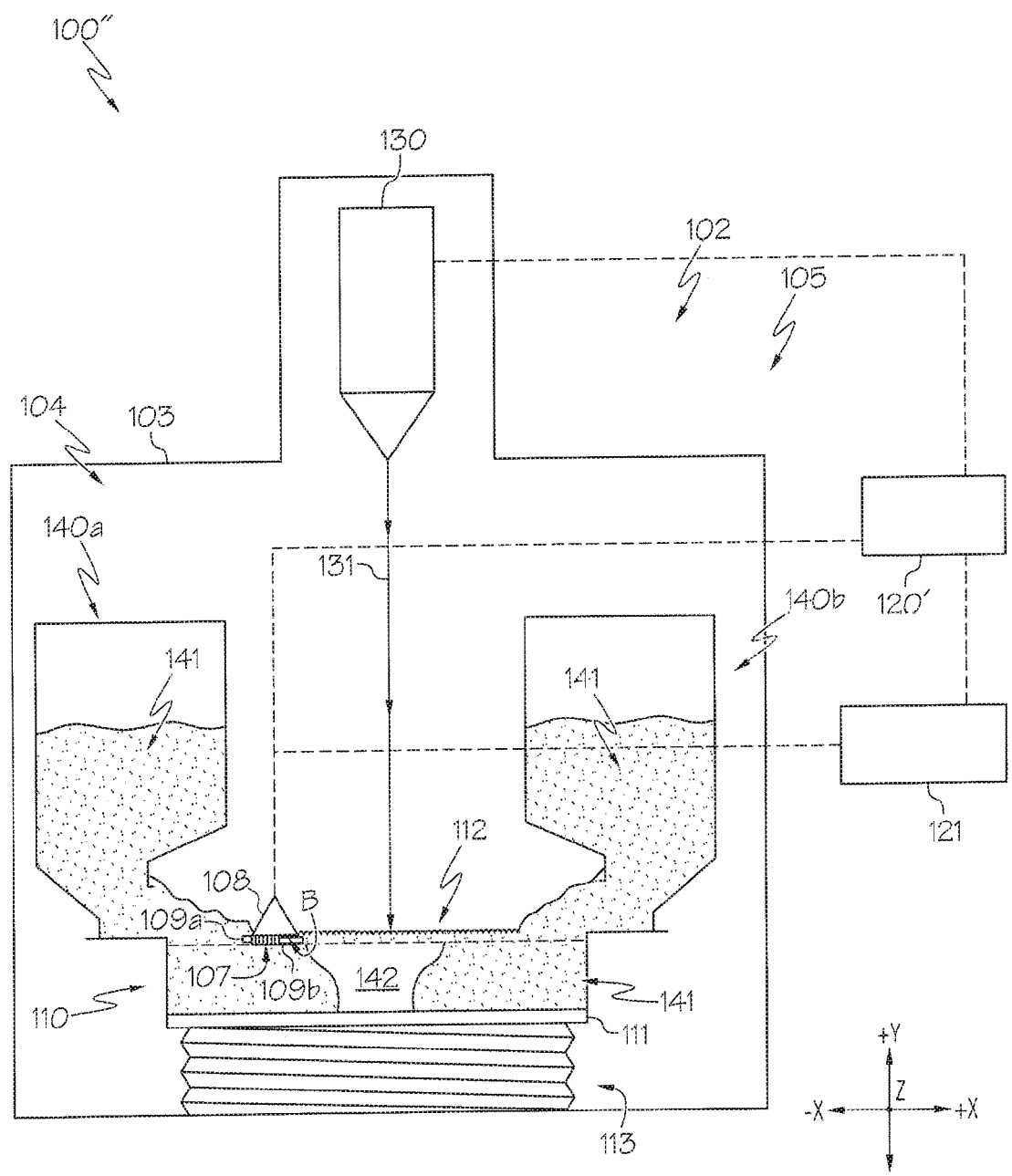
FIG. 1C schematically depicts a cutaway side view of an illustrative additive manufacturing system including a powder distributor having a plurality of optical fibers coupled thereto according to one or more embodiments shown and described herein.

One such particularly configured imaging device is depicted in FIG. 1A, whereby a single imaging device that has a field of view of the entire powder bed is used, and particularly selected regions of interest adjacent to leading and trailing ends of the powder distributor are monitored. Another particularly configured imaging device is depicted in FIG. 1B, whereby a plurality of imaging devices are optically coupled to a dynamic optical element that adjusts the field of view of each of the imaging devices to correspond to the regions of interest adjacent to the leading and trailing ends of the powder distributor. Yet another particularly configured imaging device is depicted in FIG. 1C, whereby the powder distributor includes a plurality of optical fibers coupled thereto, the optical fibers optically coupled to an image signal processor that processes images at the trailing and leading ends of the powder distributor. Any of these imaging devices can be used to determine whether the powder layer is appropriately distributed after application of the powder distributor, which can then be used to complete subsequent steps, such as passing the powder distributor over the powder layer one or more additional times. As such, the devices, systems, and methods described herein can result in a more even distribution of the powder layer, thereby lending to better formation of the article.

Electron-beam additive manufacturing, which may also be known as electron-beam melting (EBM), is a type of additive manufacturing (3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam.

Systems that utilize EBM generally obtain data from a 3D computer-aided design (CAD) model and use the data to place successive layers of the raw material using an apparatus to spread the raw material, such as a powder distributor. The successive layers are melted together utilizing a computer-controlled electron beam. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation though solidification and solid-state phase transformation.

FIG. 1A depicts a first embodiment of the present disclosure. As shown in FIG. 1A, an additive manufacturing system 100 includes at least a build chamber 102, an imaging device 114, and a control component 120. The build chamber 102 defines an interior 104 that is separated from an exterior environment 105 via one or more chamber walls 103. In some embodiments, at least a portion of the one or more chamber walls 103 of the build chamber 102 may include a window 106 therein. The imaging device 114 is generally located adjacent to the build chamber 102 in the exterior environment 105 (i.e., not located within the interior 104 of the build chamber 102), and is arranged such that a field of view 116 of the imaging device 114 extends through the window 106 into the interior 104 of the chamber.

In some embodiments, the interior 104 of the build chamber 102 may be a vacuum sealed interior such that an article 142 formed within the build chamber 102 is formed under optimal conditions for EBM, as is generally understood. The build chamber 102 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to the control component 120 such that the control component 120 directs operation of the vacuum system to maintain the vacuum within the interior 104 of the build chamber 102. In some embodiments, the vacuum system may maintain a base pressure of about $1\times10^{-5}$ mbar or less throughout an entire build cycle. In further embodiments, the vacuum system may provide a partial pressure of He to about $2\times10^{-3}$ mbar during a melting process.

In other embodiments, the build chamber 102 may be provided in an enclosable chamber provided with ambient air and atmosphere pressure. In yet other embodiments, the build chamber 102 may be provided in open air.

The build chamber 102 generally includes within the interior 104 a powder bed 110 supporting a powder layer 112 thereon, as well as a powder distributor 108. In some embodiments, the build chamber 102 may further include one or more raw material hoppers 140a, 140b that maintain raw material 141 therein. In some embodiments, the build chamber 102 may further include an emitter 130. The build chamber 102 may further include other components, particularly components that facilitate EBM, including components not specifically described herein.

The powder bed 110 is generally a platform or receptacle located within the interior 104 of the build chamber 102 that is arranged to receive the raw material 141 from the one or more raw material hoppers 140a, 140b. The powder bed 110 is not limited in size or configuration by the present disclosure, but may generally be shaped and sized to hold an amount of the raw material 141 from the raw material hoppers 140a, 140b in the form of the powder layer 112, one or more portions of article 142, and/or unfused raw material 141, as described in greater detail herein.

In some embodiments, the powder bed 110 may include a movable build platform 111 supported by a lifting component 113. The movable build platform 111 may generally be a surface within the powder bed 110 that is movable by the lifting component 113 in a system vertical direction (e.g., in the +y/−y directions of the coordinate axes of FIG. 1A) to increase and/or decrease a total volume of the powder bed 110. For example, the movable build platform 111 within the powder bed 110 may be movable by the lifting component 113 in a downward direction (e.g., toward the −y direction of the coordinate axes of FIG. 1A) so as to increase the volume of the powder bed 110. In addition, the movable build platform 111 may be movable by the lifting component 113 to add each successive powder layer 112 to the article 142 being formed, as described in greater detail herein.

The lifting component 113 is not limited by the present disclosure, and may generally be any device or system capable of being coupled to the movable build platform 111 and movable to raise or lower the movable build platform 111 in the system vertical direction (e.g., in the +y/−y directions of the coordinate axes of FIG. 1A). In some embodiments, the lifting component 113 may utilize a linear actuator type mechanism to effect movement of the movable build platform 111. Illustrative examples of devices or systems suitable for use as the lifting component 113 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component 113 may be located within the build chamber 102. In other embodiments, the lifting component 113 may be only partially located within the build chamber 102, particularly in embodiments where it may be desirable to isolate portions of the lifting component 113 that are sensitive to the harsh conditions (high heat, excessive dust, etc.) within the interior 104 of the build chamber 102.

The powder distributor 108 is generally arranged and configured to lay down and/or spread a layer of the raw material 141 as the powder layer 112 in the powder bed 110 (e.g., on start plate or build platform 111 within the powder bed). That is, the powder distributor 108 is arranged such that movement of the powder distributor 108 is in a horizontal plane defined by the x-axis and the z-axis of the coordinate axes depicted in FIG. 1A. For example, the powder distributor 108 may be an arm, rod, or the like that extends a distance in the z direction of the coordinate axes of FIG. 1A over or above the powder bed 110 (e.g., from a first end to a second end of the powder bed 110). In some embodiments, the length of the powder distributor 108 may be longer than a width of the build platform 111 such that the powder layer 112 can be distributed on each position of the build platform 111. In some embodiments, the powder distributor 108 may have a central axis in parallel with a top surface of the build platform 111 (e.g., generally parallel to the +x/−x axis of the coordinate axes of FIG. 1A). One or more motors, actuators, and/or the like may be coupled to the powder distributor 108 to effect movement of the powder distributor 108. For example, a rack and pinion actuator may be coupled to the powder distributor 108 to cause the powder distributor 108 to move back and forth over the powder bed in the +x/−x directions of the coordinate axes of FIG. 1A, as indicated by the double sided arrow depicted above the powder distributor 108 in FIG. 1A. In some embodiments, movement of the powder distributor 108 may be continuous (e.g., moving without stopping, other than to change direction). In other embodiments, movement of the powder distributor 108 may be stepwise (e.g., moving in a series of intervals). In yet other embodiments, movement of the powder distributor 108 may be such that a plurality of interruptions occur between periods of movement.

As described in greater detail herein, the powder distributor may further include one or more teeth (e.g., rake fingers or the like) that extend from the powder distributor 108 into the raw material 141 from the raw material hoppers 140*a*, 140*b* to cause disruption of the raw material 141 when the powder distributor 108 moves (e.g., to distribute the raw material 141, to spread the powder layer 112, etc.). Additional details regarding the teeth of the powder distributor 108 will be discussed in greater detail hereinbelow.

In embodiments, the powder distributor 108 includes a plurality of rake teeth 107 extending from a bottom surface B of the powder distributor 108 (e.g., extending generally towards the −y direction of the coordinate axes of FIG. 1A). In some embodiments, the rake teeth 107 may extend in a direction that is substantially perpendicular to a plane of the build platform 111 (e.g., perpendicular to the plane formed by the x-axis and z-axis of the coordinate axes depicted in FIG. 1A). In another embodiment, the rake teeth 107 may be slanted with respect to the build platform 111. An angle a of the slanted rake teeth 107 with respect to a normal to the build platform may be any value, and in some embodiments is between about 0 and about 45°.

In some embodiments, each one of the plurality of rake teeth 107 may be a metal foil or a metal sheet. The total length of the plurality of rake teeth 107 may be longer than a width of the build platform 111 in order to make it possible to distribute powder on each position of the build platform 111. As will be described in greater detail herein, the rake teeth 107 may be shaped and sized to rake through the raw material 141 to distribute the powder layer 112 on the build platform 111.

It should be understood that while the powder distributor 108 described herein generally extends a distance in the x direction of the coordinate axes depicted in FIG. 1A and moves in the +x/−x directions of the coordinate axes depicted in FIG. 1A to spread the powder layer 112 as described above, this is merely one illustrative example. Other configurations are also contemplated. For example, the powder distributor 108 may rotate about an axis to spread the powder layer 112, may articulate about one or more joints or the like to spread the powder layer 112, and/or the like without departing from the scope of the present disclosure.

In some embodiments, a cross section of the powder distributor 108 may be generally triangular, as depicted in FIG. 1A. However, it should be understood that the cross section may be any shape, including but not limited to, circular, elliptical, quadratic, rectangular, polygonal or the like. A height of the powder distributor 108 may be set in order to give the powder distributor 108 a particular mechanical strength in the system vertical direction (e.g., along the +y/−y axis of the coordinate axes of FIG. 1A). That is, in some embodiments, the powder distributor 108 may have a particular controllable flex in the system vertical direction. The height of the powder distributor may also be selected taking into account that the powder distributor 108 pushes an amount of the raw material 141. If the height of the powder distributor 108 is too small, the powder distributor 108 can only push forward a smaller amount relative to a higher power powder distributor 108. However, if the height of the powder distributor 108 is too high, the powder distributor 108 may complicate the powder catching from a scree of powder, (e.g., the higher the height of the powder distributor 108, the more force may be required in order to catch a predetermined amount of powder from the scree of powder by moving the powder distributor 108 into the scree of powder and letting a predetermined amount of powder fall over the top of the powder distributor 108 from a first side in the direction of travel into the scree of powder to a second side in the direction of the build platform 111). In still yet other embodiments, the height of the powder distributor 108 may be such that areas adjacent to both a leading edge and a trailing edge of the powder distributor 108 are within a field of view 116 of the imaging device 114, as described herein.

In some embodiments, the powder distributor 108 may be communicatively coupled to the control component 120, as depicted by the dashed line in FIG. 1A between the powder distributor 108 and the control component 120. As used herein, the term "communicatively coupled" generally refers to any link in a manner that facilitates communications. As such, "communicatively coupled" includes both wireless and wired communications, including those wireless and wired communications now known or later developed. As the powder distributor 108 is communicatively coupled to the control component 120, the control component 120 may transmit one or more signals, data, and/or the like to cause the powder distributor 108 to move, change direction, change speed, and/or the like. For example, a "reverse direction" signal transmitted by the control component 120 to the powder distributor 108 may cause the powder distributor 108 to reverse the direction in which it is moving (e.g., reverse movement in the +x direction to movement in the −x direction).

Each of the raw material hoppers 140a, 140b may generally be containers that hold an amount of the raw material 141 therein and contain an opening to dispense the raw material 141 therefrom. While FIG. 1A depicts two raw material hoppers 140a, 140b, the present disclosure is not limited to such. That is, any number of raw material hoppers may be utilized without departing from the scope of the present disclosure. Further, while FIG. 1A depicts the raw material hoppers 140a, 140b as being located within the interior 104 of the build chamber 102, the present disclosure is not limited to such. That is, the raw material hoppers 140a, 140b may be located outside or partially outside the build chamber 102 in various other embodiments. However, it should be understood that if a raw material hopper is located outside or partially outside the build chamber 102, one or more outlets of the raw material hoppers that supply the raw material 141 may be selectively sealed when not distributing the raw material 141 in order to maintain the vacuum within the build chamber 102.

The shape and size of the raw material hoppers 140a, 140b are not limited by the present disclosure. That is, the raw material hoppers 140a, 140b may generally have any shape and or size without departing from the scope of the present disclosure. In some embodiments, each of the raw material hoppers 140a, 140b may be shaped and or sized to conform to the dimensions of the build chamber 102 such that the raw material hoppers 140a, 140b can fit inside the build chamber. In some embodiments, the raw material hoppers 140a, 140b may be shaped and sized such that a collective volume of the raw material hoppers 140a, 140b is sufficient to hold an amount of raw material 141 that is necessary to fabricate the article 142, which includes a sufficient amount of material to form each successive powder layer 112 and additional material that makes up the unfused raw material 141.

The raw material hoppers 140a, 140b may generally have an outlet for ejecting the raw material 141 located within the raw material hoppers 140a, 140b such that the raw material 141 can be spread by the powder distributor 108, as described herein. In some embodiments, such as the embodiment depicted in FIG. 1A, the raw material 141 may freely flow out of the raw material hoppers 140a, 140b under the force of gravity, thereby forming piles or scree of raw material 141 for the powder distributor 108 to spread. In other embodiments, the outlets of the raw material hoppers 140a, 140b may be selectively closed via a selective closing mechanism so as to only distribute a portion of the raw material 141 located within the respective raw material hoppers 140a, 140b at a particular time. The selective closing mechanisms may be communicatively coupled to the control component 120 such that data and/or signals transmitted to/from the control component 120 can be used to selectively open and close the outlets of the raw material hoppers 140a, 140b.

The raw material 141 contained within the raw material hoppers 140a, 140b and used to form the article 142 is not limited by the present disclosure, and may generally be any raw material used for EBM now known or later developed. Illustrative examples of raw material 141 includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material 141 include, but are not limited to, Ti6Al4V titanium alloy, Ti6Al4V ELI titanium alloy, Grade 2 titanium, and ASTM F75 cobalt-chrome (all available from Arcam AB, Molndal, Sweden). Another specific example of raw material 141 is INCONEL® alloy 718 available from Special Metals Corporation (Huntington W. Va.).

In embodiments, the raw material 141 is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

The emitter 130 is generally a device that emits an electron beam (e.g., a charged particle beam), such as, for example, an electron gun, a linear accelerator, or the like. The emitter 130 generates an energy beam 131 that may be used for melting or fusing together the raw material 141 when spread as the powder layer 112 on the build platform 111. In some embodiments, the emitter 130 may include at least one focusing coil, at least one deflection coil and an electron beam power supply, which may be electrically connected to an emitter control unit. In one illustrative embodiment, the emitter 130 generates a focusable electron beam with an accelerating voltage of about 60 kilovolts (kV) and with a beam power in the range of about 0 kilowatts (kW) to about 10 kW. The pressure in the vacuum chamber may be in the range of about $1\times10^{-3}$ mBar to about $1\times10^{-6}$ mBar when building the article 142 by fusing each successive powder layer 112 with the energy beam 131. In some embodiments, the emitter 130 may be communicatively coupled to the control component 120, as indicated in FIG. 1A by the dashed line between the emitter 130 and the control component 120. The communicative coupling of the emitter 130 to the control component 120 may provide an ability for signals and/or data to be transmitted between the emitter 130 and the control component 120, such as control signals from the control component 120 that direct operation of the emitter 130.

Still referring to FIG. 1A, the imaging device 114 is generally located in the exterior environment 105 outside the build chamber 102, yet positioned such that the field of view 116 of the imaging device 114 is through the window 106 of the build chamber 102. The imaging device 114 is generally positioned outside the build chamber 102 such that the harsh environment within the interior 104 of the build chamber 102 does not affect operation of the imaging device 114. That is, the heat, dust, metallization, x-ray radiation, and/or the like that occurs within the interior 104 of the build chamber 102 will not affect operation of the imaging device 114. In embodiments, the imaging device 114 is fixed in position such that the field of view 116 remains constant (e.g., does not change). Moreover, the imaging device 114 is arranged in the fixed position such that the field of view 116 of the imaging device 114 encompasses an entirety of the powder bed 110. That is, the imaging device 114 is capable of imaging the entire powder bed 110 within the build chamber 102 through the window 106.

In some embodiments, the imaging device 114 is a device particularly configured to sense electromagnetic radiation, particularly heat radiation (e.g., thermal radiation) that is generated by the various components within the powder bed 110 (e.g., the powder layer 112, the raw material 141, and/or the article 142). Thus, the imaging device 114 may generally be a device particularly tuned or otherwise configured to obtain images in spectra where heat radiation is readily detected, such as the visible spectrum and the infrared spectrum (including the far infrared and the near infrared spectrum). As such, one illustrative example of a device particularly tuned or otherwise configured to obtain images in spectra where heat radiation includes, but is not limited to, an infrared camera. In some embodiments, the imaging device 114 may be a camera that is sensitive within a range of wavelengths of about 1 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or any value or range between any two of these values (including endpoints). As such, the imaging device 114 is suitable for imaging temperatures which occur during EBM of the powder layer 112. In some embodiments, the wavelength sensitivity of the imaging device 114 may be selected in accordance with the type of raw material used. Illustrative examples of suitable devices that may be used for the imaging device 114 include, but are not limited to, an IR-camera (Infrared-camera), NIR-camera (Near Infrared-camera), a VISNIR-camera (Visual Near Infrared-camera), a CCD camera (Charged Coupled Device-camera), and a CMOS-camera (Complementary Metal Oxide Semiconductor-camera).

In some embodiments, the imaging device 114 may be an area scan camera that is capable of providing data specific to one or more regions of interest within the field of view 116, including regions of interest that move within the field of view 116. That is, an area scan camera includes a matrix of pixels that allows the device to capture a 2D image in a single exposure cycle with both vertical and horizontal elements. Area scan cameras can further be used to obtain a plurality of successive images, which is useful when selecting regions of interest within the field of view 116 and observing a change in the regions of interest, as described in greater detail herein. Illustrative examples of such area scan cameras include those available from Basler AG (Ahrensburg, Germany), JAI Ltd. (Yokohama, Japan), National Instruments (Austin, Tex.), and Stemmer Imaging (Puchheim, Germany).

In some embodiments, the imaging device 114 may have a monochrome image sensor. In other embodiments, the imaging device 114 may have a color image sensor. In various embodiments, the imaging device 114 may include one or more optical elements, such as lenses, filters, and/or the like. In a particular embodiment, the imaging device 114 may include a Bayer filter. As is generally understood, a Bayer filter is a color filter array (CFA) for arranging RGB color filters on a square grid of photosensors to create a color image, such as a filter pattern of about 50% green, about 25% red, and about 25% blue.

In some embodiments, the imaging device 114 may further be a device particularly configured to provide signals and/or data corresponding to the sensed electromagnetic radiation to the control component 120. As such, the imaging device 114 may be communicatively coupled to the control component 120, as indicated by the dashed lines depicted in FIG. 1A between the imaging device 114 and the control component 120.

It should be understood that, by locating the imaging device 114 in the exterior environment 105 outside the interior 104 of the build chamber 102, it is possible to easily retrofit existing build chambers having windows in the chamber walls 103 therein with a kit that includes the imaging device 114 so as to upgrade the existing build chambers with the capabilities described herein.

The control component 120 is generally a device that is communicatively coupled to one or more components of the additive manufacturing system 100 (e.g., the powder distributor 108, the imaging device 114, and/or the emitter 130) and is particularly arranged and configured to transmit and/or receive signals and/or data to/from the one or more components of the additive manufacturing system 100. Additional details regarding the control component 120 will be discussed herein with respect to FIGS. 3A-3D.

FIG. 1B depicts another illustrative additive manufacturing system 100' according to one or more embodiments. Similar to the additive manufacturing system 100 depicted in FIG. 1A, the additive manufacturing system 100' of FIG. 1B also includes at least a build chamber 102 and a control component 120. The various components of the build chamber 102, including the one or more chamber walls 103, the interior 104 of the build chamber 102, the window 106, the powder distributor 108 including the rake teeth 107, the powder bed 110 containing the movable build platform 111 and the lifting component 113 and supporting the powder layer 112 formed by the powder distributor 108 from the raw material 141 contained within the raw material hoppers 140a, 140b, and the emitter 130 are all similar to those described with respect to FIG. 1A. As such, for the purposes of brevity, such components of the build chamber will not be described further with respect to FIG. 1B. Furthermore, the control component 120 is similar to the control component 120 depicted in FIG. 1A.

Still referring to FIG. 1B, the additive manufacturing system 100' further includes a plurality of imaging devices 114a, 114b that are optically coupled to a dynamic optical element 118. As used herein, the term "optically coupled" means that components (e.g., the plurality of imaging devices 114a, 114b and the dynamic optical element 118) are positioned so that light is able to pass from one component to another component (e.g., from the dynamic optical element to one or more of the plurality of imaging devices 114a, 114b) without substantial interference. In some embodiments, optical coupling may be achieved by directly contacting the dynamic optical element 118 with one or more of the plurality of imaging devices 114a, 114b. In other embodiments, optical coupling may be achieved by spacing the various components apart from one another such that light between the elements has to travel through another medium, such as air, a waveguide, or the like.

As depicted in FIG. 1B, the plurality of imaging devices 114a, 114b and the dynamic optical element 118 are positioned in the exterior environment 105 exterior to the one or more chamber walls 103 of the build chamber 102 in a location that is adjacent to the build chamber 102, particularly the window 106. Such a location prevents exposure of the plurality of imaging devices 114a, 114b and the dynamic optical element 118 to the harsh environment within the interior 104 of the build chamber, thereby avoiding exposure to heat, dust, metallization, x-ray radiation, and/or the like, which may affect operation of the plurality of imaging devices 114a, 114b and/or the dynamic optical element 118. Further, the location of the plurality of imaging devices 114a, 114b and the dynamic optical element 118 adjacent to the build chamber 102 allows for a kit containing the plurality of imaging devices 114a, 114b and the dynamic optical element 118 to be retrofitted to an existing build chamber.

While the embodiment of FIG. 1B depicts two imaging devices 114a, 114b and a single dynamic optical element 118, the present disclosure is not limited to such. That is, 2, 3, 4, 5, 6, 7, 8, 9, 10 or more imaging devices may be utilized in some embodiments. Further, a plurality of dynamic optical elements 118 may be utilized in some embodiments. However, it should be understood that regardless of the number of imaging devices 114a, 114b and regardless of the number of dynamic optical elements 118, the features and functionality described herein remains the same or similar.

Each of the plurality of imaging devices 114a, 114b is a line scan device particularly configured to sense a line of electromagnetic radiation, particularly heat radiation (e.g., thermal radiation) that is generated by the various components within the powder bed 110 (e.g., the powder layer 112, the raw material 141, and/or the article 142). Thus, each of the plurality of imaging devices 114a, 114b may generally be a line scan device particularly tuned or otherwise configured to obtain a line of data in spectra where heat radiation is readily detected, such as the visible spectrum and the infrared spectrum (including the far infrared and the near infrared spectrum). As such, one illustrative example of a device particularly tuned or otherwise configured to obtain images in spectra where heat radiation includes, but is not limited to, an infrared line scan camera. In some embodiments, each of the plurality of imaging devices 114a, 114b may be a line scan camera that is sensitive within a range of wavelengths of about 1 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or any value or range between any two of these values (including endpoints). As such, each of the plurality of imaging devices 114a, 114b is suitable for imaging temperatures which occur during EBM of the powder layer 112. In some embodiments, the wavelength sensitivity of each of the plurality of imaging devices 114a, 114b may be selected in accordance with the type of raw material used.

As noted herein, each of the plurality of imaging devices 114a, 114b is a line scan camera. A line scan camera is a type of image detector that can very quickly capture a single row of pixels of a target (e.g., a single row of pixels in an area adjacent to a leading edge of the powder distributor 108 and/or a single row of pixels in an area adjacent to a trailing edge of the powder distributor 108, as described in greater detail herein). In some embodiments, each of the plurality of imaging devices 114a, 114b may be a hyperspectral line scan camera. Illustrative examples of such line scan cameras include those available from or later developed by Photonfocus AG (Lachen, Switzerland), Basler AG (Ahrensburg, Germany), National Instruments (Austin, Tex.), and Stemmer Imaging (Puchheim, Germany).

In various embodiments, each of the plurality of imaging devices 114a, 114b may include one or more optical elements, such as lenses, filters, and/or the like. In a particular embodiment, each of the plurality of imaging devices 114a, 114b may include a Bayer filter. As is generally understood, a Bayer filter is a color filter array (CFA) for arranging RGB color filters on a square grid of photosensors to create a color image, such as a filter pattern of about 50% green, about 25% red, and about 25% blue.

In some embodiments, each of the plurality of imaging devices 114a, 114b may further be a device particularly configured to provide signals and/or data corresponding to the sensed electromagnetic radiation to the control component 120. As such, the plurality of imaging devices 114a, 114b may be communicatively coupled to the control component 120, as indicated by the dashed lines depicted in FIG. 1B between each one of the plurality of imaging devices 114a, 114b and the control component 120.

The dynamic optical element 118 is generally a device that is adjustable, movable, or the like to continuously alter the light that is received by each of the plurality of imaging devices 114a, 114b. For example, the dynamic optical element 118 may alter the location of the light that is received by each of the plurality of imaging devices 114a, 114b such that the plurality of imaging devices 114a, 114b can sense different target areas without moving the imaging devices 114a, 114b, as described in greater detail herein.

In the embodiment depicted in FIG. 1B, the dynamic optical element 118 may be a mirror, lens, prism, or the like that receives light from a different direction based on the orientation of the dynamic optical element 118. The dynamic optical element 118 may include a motor or the like that alters the orientation or other characteristics of the dynamic optical element 118 via application of electrical energy, mechanical energy, or force. As such, the dynamic optical element 118 reflects light received in one location toward one or more of the plurality of imaging devices 114a, 114b. As the dynamic optical element rotates about an axis A due to application of the electrical energy, mechanical energy, or force (as indicated by the arrow running in a clockwise direction), the location of the received light changes, thereby moving a respective field of view 122a, 122b of each of the plurality of imaging devices 114a, 114b.

In embodiments, movement or alteration of the light by the dynamic optical element 118 may be synchronized with movement of the powder distributor 108 such that the dynamic optical element 118 moves the fields of view 122a, 122b of the imaging devices 114a, 114b in concert with the movement of the powder distributor 108. In some embodiments, such synchronization may be mechanically achieved, such as, for example, via a mechanical coupling between the powder distributor 108 and the dynamic optical element 118. In other embodiments, such synchronization may be electromechanically achieved, such as, for example, by communicatively coupling mechanical drive components on both the powder distributor 108 and the dynamic optical element 118 to a single controller or a plurality of synchronized controllers that transmit synchronized control signals to the mechanical drive components to cause the mechanical drive components to move in concert with one another. Various mechanical and electromechanical devices that achieve this synchronized movement should generally be understood.

In other embodiments, the dynamic optical element 118 may be any other optical device that alters the direction of light received so as to alter the respective fields of view 122a, 122b of the plurality of imaging devices 114a, 114b. For example, the dynamic optical element 118 may include a flexible element. The flexible element may be a membrane that is a surface of the dynamic optical element 118. The flexible element may be configured to alter its shape by, for example, altering the radius of curvature of the flexible element or a portion thereof, altering a displacement relative to a fixed element, and/or altering the shape of a surface region of the flexible element (e.g., the application of force or electrical current/voltage to the flexible element may create a pattern over the surface of the flexible element that affects the optical path of light through the dynamic optical element 118). In still yet other embodiments, the dynamic optical element may be a MEMS mirror or the like that moves to alter the locations of the respective fields of view 122a, 122b of the imaging devices 114a, 114b. Other means of altering the respective fields of view 122a, 122b of the imaging devices 114a, 114b are contemplated and are included within the scope of the present disclosure.

In some embodiments, a dynamic optical element may be incorporated within each one of the plurality of imaging devices 114a, 114b to alter the respective fields of view 122a, 122b of the imaging devices 114a, 114b (e.g., dynamic optic imaging devices).

FIG. 1C depicts yet another illustrative additive manufacturing system 100" according to one or more embodiments. Similar to the additive manufacturing system 100 depicted in FIG. 1A, the additive manufacturing system 100" of FIG. 1C also includes at least a build chamber 102. The various components of the build chamber 102, including the one or more chamber walls 103, the interior 104 of the build chamber 102, the powder distributor 108 including the rake teeth 107, the powder bed 110 containing the movable build platform 111 and the lifting component 113 and supporting the powder layer 112 formed by the powder distributor 108 from the raw material 141 contained within the raw material hoppers 140a, 140b (and also the unfused raw material 141), and the emitter 130 are all similar to those described with respect to FIG. 1A. As such, for the purposes of brevity, such components of the build chamber will not be described further with respect to FIG. 1C. However, the build chamber 102 depicted in FIG. 1C does not contain a window.

Still referring to FIG. 1C, the additive manufacturing system 100" further includes leading optical fibers 109a and a plurality of trailing optical fibers 109b that are coupled to the powder distributor 108. The leading optical fibers 109a and the trailing optical fibers 109b are optically coupled to an image signal processor 121, as indicated by the dashed line between the powder distributor 108 and the image signal processor 121. In the embodiment depicted in FIG. 1C, the image signal processor 121 is located outside the interior 104 of the build chamber 102. As such, optical coupling between the powder distributor 108 and the optical fibers 109a, 109b may be achieved via a transmission medium, such as additional fibers, a waveguide, or the like. The transmission medium may extend through the chamber wall 103 of the build chamber 102 and optically couple the image signal processor 121 with the optical fibers 109a, 109b.

Figure 2:
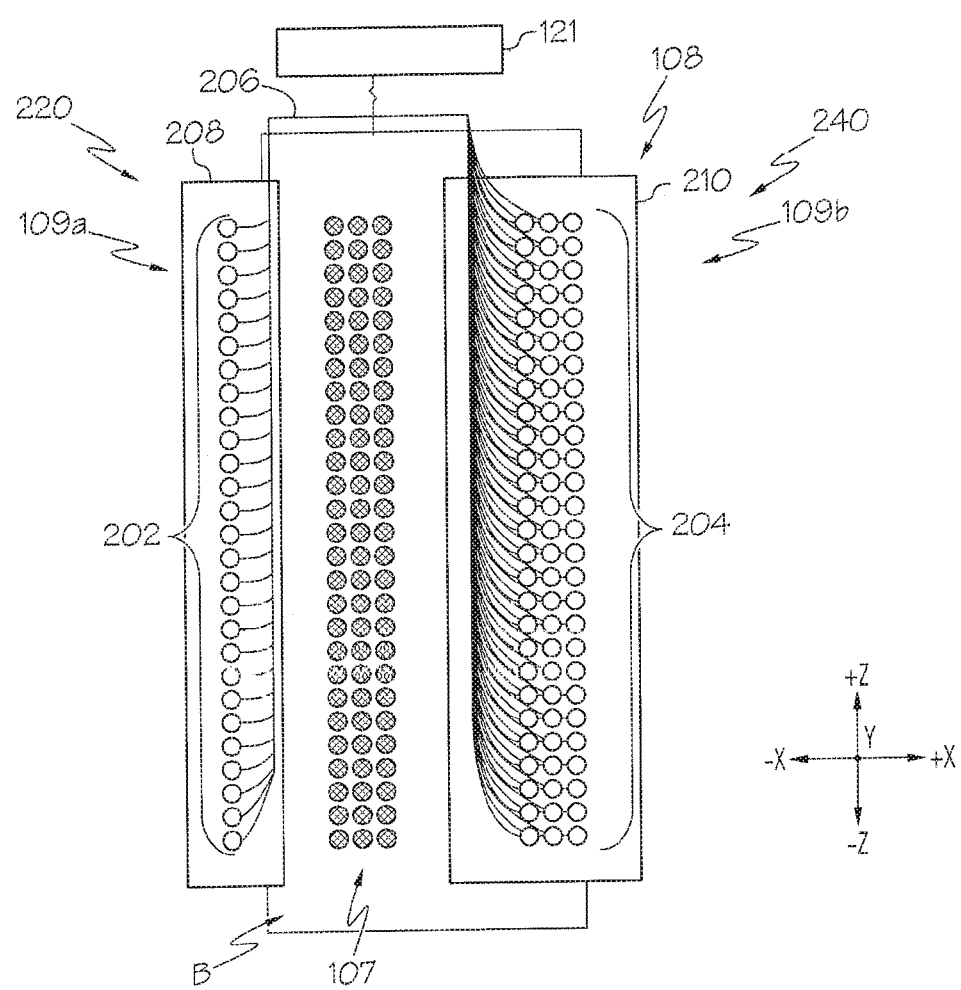
FIG. 2 depicts a bottom view of the powder distributor of FIG. 1C according to one or more embodiments shown and described herein.

Referring to FIGS. 1C and 2, the bottom surface B of the powder distributor 108 is depicted. As shown in FIG. 2, terminal ends 202 of the plurality of leading optical fibers 109a are located at a leading end 220 of the powder distributor and terminal ends 204 of the plurality of trailing optical fibers 109b are located at a trailing end 240 of the powder distributor 108. In addition, the terminal ends 202, 204 are located at the bottom surface B such that the terminal ends 202, 204 face the powder layer 112 depicted in FIG. 1C. Electromagnetic radiation from the powder layer 112 that is received by the terminal ends 202, 204 is transmitted via a transmission medium 206 to the image signal processor 121. In some embodiments, the terminal ends 202, 204 of the optical fibers 109a, 109b may be mounted within a ceramic substrate or other similar substrate that is able to withstand the harsh environment of the build chamber 102.

Given the harsh environments within the build chamber 102, the terminal ends 202, 204 may not be directly exposed to the interior 104 of the build chamber 102. Rather, leading cover glass 208 may cover the terminal ends 202 of the plurality of leading optical fibers 109a and trailing cover glass 210 may cover the terminal ends 204 of the plurality of trailing optical fibers 109b. The leading cover glass 208 and the trailing cover glass 210 are generally shaped and sized to cover each of the respective terminal ends 202, 204 and are generally constructed of a material that is able to withstand the high heat and low pressure that may be present within the build chamber 102. In some embodiments, the leading cover glass 208 and the trailing cover glass 210 may be constructed of a material that does not alter the electromagnetic radiation transmitted therethrough, so as to not alter the determined characteristics of the powder layer 112. In other embodiments, the leading cover glass 208 and the trailing cover glass 210 may be constructed of a material that acts as a filter, such as a Bayer filter or the like.

As shown in FIG. 2, the leading optical fibers 109a are arranged in a single column and the trailing optical fibers 109b are arranged in three columns. While the present disclosure is not limited to any particular arrangement of the optical fibers 109a, 109b, it should be understood that each of a plurality of columns may be used to obtain distinct image data from each of the columns for a more finite reading of the image data, thereby providing a more accurate indication of a gradient. That is, additional columns may allow for additional image data of the one or more points, which in turn lends itself to an ability to make additional comparisons of the one or more points to more accurately determine the distribution of the powder layer 112.

As also depicted in FIGS. 1C and 2, the rake teeth 107 are disposed between the plurality of leading optical fibers 109a and the plurality of trailing optical fibers 109b on the bottom surface B of the powder distributor 108.

Referring again to FIG. 1C, the image signal processor 121 may generally be a device particularly configured to receive the electromagnetic radiation (e.g., heat radiation/thermal radiation) emitted by the various components within the powder bed 110 (e.g., the powder layer 112, the raw material 141, and/or the article 142) via the plurality of leading optical fibers 109a and the plurality of trailing optical fibers 109b, and generate image data corresponding thereto (e.g., leading image data corresponding to the electromagnetic radiation received via the leading optical fibers 109a and trailing image data corresponding to the electromagnetic radiation received via the trailing optical fibers 109b). Put another way, the image signal processor 121 is generally a device configured to receive the electromagnetic radiation in the form of images in various regions of interest that are within a field of view of each of the plurality of optical fibers. In some embodiments, the image signal processor 121 may be particularly tuned or otherwise configured to obtain electromagnetic radiation via the optical fibers 109a, 109b in spectra where heat radiation is readily detected, such as the visible spectrum and the infrared spectrum (including the far infrared and the near infrared spectrum). In some embodiments, the image signal processor 121 is sensitive within a range of wavelengths of about 1 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or any value or range between any two of these values (including endpoints). As such, the image signal processor 121, in combination with the optical fibers 109a, 109b coupled thereto, is suitable for imaging temperatures that occur during EBM of the powder layer 112. In some embodiments, the wavelength sensitivity of the image signal processor 121 may be selected in accordance with the type of raw material used.

In some embodiments, the image signal processor 121 may further be a device particularly configured to provide signals and/or data corresponding to the sensed electromagnetic radiation (e.g., the data generated as a result of receiving the electromagnetic radiation) to a control component 120'. As such, the image signal processor 121 may be communicatively coupled to the control component 120, as indicated by the dashed lines depicted in FIG. 1C between the image signal processor 121 and the control component 120.

The image signal processor 121 may include various internal components for carrying out various processes relating to receiving electromagnetic radiation, generating data, and transmitting data. For example, the image signal processor 121 may include components such as a processing device, a memory (including non-transitory memory), a photodiode, a digital signal processing component, interface hardware, and/or the like. In some embodiments, the image signal processor 121 may be a system on a chip having a multi-core processor architecture. In some embodiments, a photodiode portion of the image signal processor 121 may be optically coupled to each of the optical fibers 109a, 109b and may be configured to generate electrical signals in response to the electromagnetic radiation received from the optical fibers 109a, 109b.

Figure 3A:
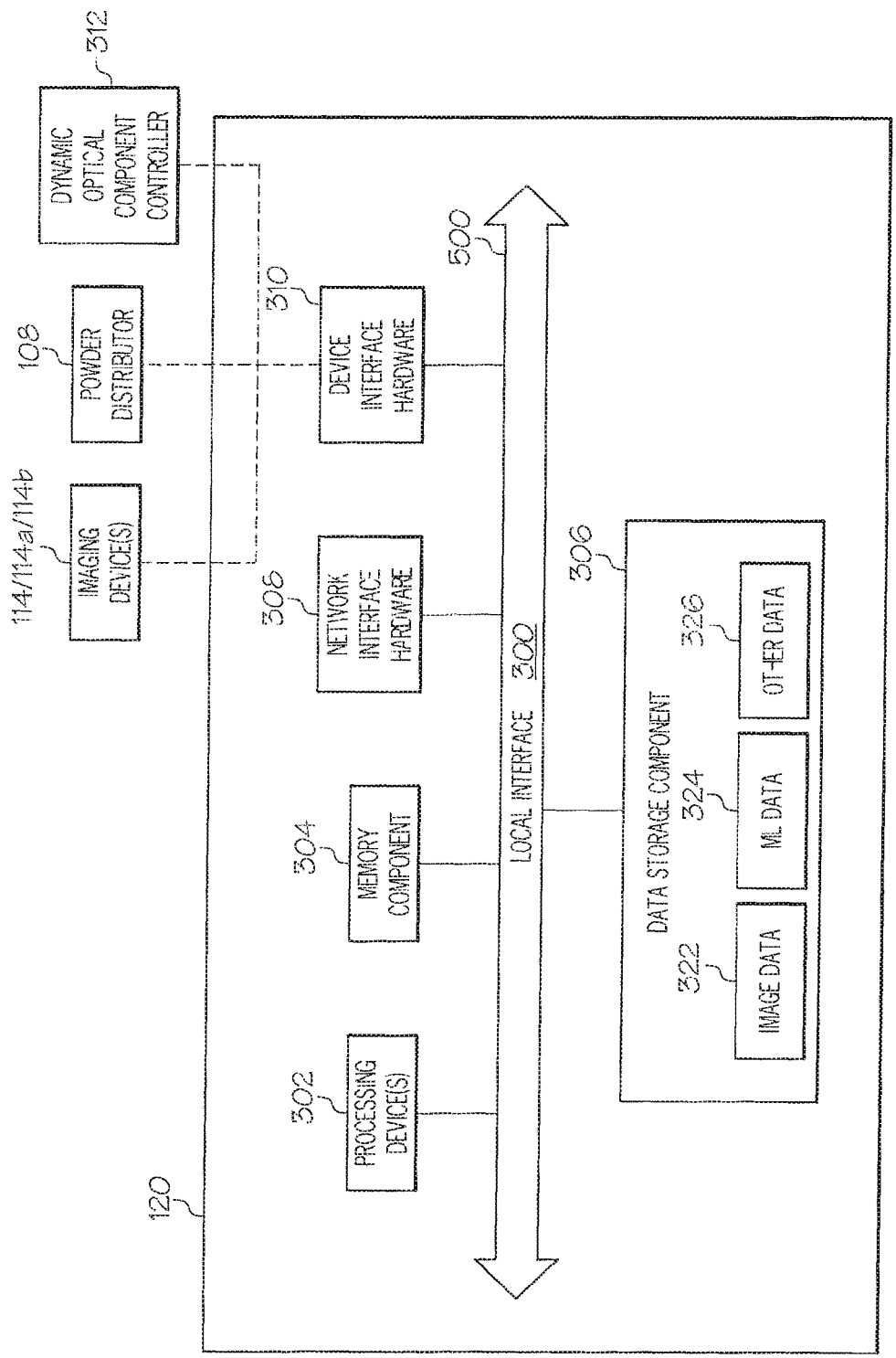
FIG. 3A depicts a block diagram of illustrative internal components of a control component that is utilized to analyze image data and/or assist with control of the additive manufacturing system of FIG. 1A or FIG. 1B according to one or more embodiments shown and described herein.

Turning to FIG. 3A, the various internal components of the control component 120 depicted in FIGS. 1A-1B is shown. Particularly, FIG. 3A depicts various system components for analyzing image data received from the imaging device 114 of FIG. 1A or the image data received from the imaging devices 114a, 114b of FIG. 1B and/or assisting with the control of various components of the additive manufacturing systems 100, 100' depicted in FIGS. 1A and 1B.

As illustrated in FIG. 3A, the control component 120 may include one or more processing devices 302, a non-transitory memory component 304, network interface hardware 308, device interface hardware 310, and a data storage component 306. A local interface 300, such as a bus or the like, may interconnect the various components.

The one or more processing devices 302, such as a computer processing unit (CPU), may be the central processing unit of the control component 120, performing calculations and logic operations to execute a program. The one or more processing devices 302, alone or in conjunction with the other components, are illustrative processing devices, computing devices, processors, or combinations thereof. The one or more processing devices 302 may include any processing component configured to receive and execute instructions (such as from the data storage component 306 and/or the memory component 304).

The memory component 304 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 304 may include one or more programming instructions thereon that, when executed by the one or more processing devices 302, cause the one or more processing devices 302 to complete various processes, such as the processes described herein with respect to FIG. 7.

Still referring to FIG. 3A, the programming instructions stored on the memory component 304 may be embodied as a plurality of software logic modules, where each logic module provides programming instructions for completing one or more tasks. FIG. 3C depicts the various modules of the memory component 304 of FIG. 3A according to various embodiments.

As shown in FIG. 3C, the memory component includes a plurality of logic modules. Each of the logic modules shown in FIG. 3C may be embodied as a computer program, firmware, or hardware, as an example. Illustrative examples of logic modules present in the memory component 304 include, but are not limited to, image data receiving logic 360, image data analysis logic 362, point selection logic 364, characteristic determination logic 366, region of interest determination logic 368 (e.g., ROI determination logic), comparison logic 370, powder distributor recognition logic 372, and/or device interface logic 374.

Referring to FIGS. 3A and 3C, the image data receiving logic 360 includes one or more programming instructions for receiving image data from imaging device 114 or imaging devices 114a, 114b. That is, the image data receiving logic 360 may cause a connection between the device interface hardware 310 and the imaging device 114 of FIG. 1A or the imaging devices 114a, 114b of FIG. 1B such that data transmitted by the imaging device 114 or imaging devices 114a, 114b is received by the control component 120. Further, the data transmitted by the imaging device 114 or imaging devices 114a, 114b may be stored (e.g., within the data storage component 306).

The image data analysis logic 362 includes one or more programming instructions for analyzing image data received from imaging device 114 or imaging devices 114a, 114b. That is, the image data analysis logic 362 contains programming for analyzing pixels contained within image data, determining groupings of pixels based on various characteristics, extracting information from pixels (e.g., brightness, intensity, color, and/or the like), and/or completing other image analysis tasks now known or later developed.

Referring to FIGS. 1A-1B and 3C, the point selection logic 364 includes one or more programming instructions for selecting one or more points on the powder layer 112 from the image data for the purposes of analyzing changes to the one or more points, as described in greater detail herein. That is, the point selection logic 364 may contain programming for determining one or more pixels from the image data that correspond to one or more points on the powder layer 112 based on characteristics of the pixels that are indicative of points on the powder layer 112. The point selection logic 364 may further include programming instructions for determining that the selected one or more points are located in a leading region of interest or in a location where a leading region of interest will be at a future point in time based on movement of the powder distributor 108. In some embodiments, the one or more selected points may be assigned a location identifier such that the one or more points can later be determined in subsequent image data. For example, each one of the one or more points may be assigned coordinates relative to one or more fixed areas in the image data such that the points can be located at the same coordinates in subsequent image data. That is, if a particular point is located 82 pixels up and 17 pixels to the right from a lower left hand corner of an image, the point may be assigned coordinates of (17, 82) or the like. Other location identifiers should generally be understood.

Still referring to FIGS. 1A-1B and 3C, the characteristic determination logic 366 includes one or more programming instructions for determining characteristics of the selected one or more points that have been selected according to the point selection logic 364. That is, the characteristic determination logic 366 may contain programming usable to determine characteristics of the powder layer at the one or more points based on the image data of the pixels at the one or more points. For example, the characteristic determination logic 366 may contain programming for determining characteristics such as brightness, intensity, color, and/or the like. In some embodiments, the characteristic determination logic 366 may contain programming that is usable to determine information pertaining to spatial temperature gradients at the one or more points and/or temporal temperature gradients at the one or more points.

Still referring to FIGS. 1A-1B and 3C, the region of interest determination logic 368 includes one or more programming instructions for determining a location of each of a plurality of regions of interest from the image data. As will be described in greater detail herein, the regions of interest include a leading region of interest located adjacent to a leading end of the powder distributor 108 and a trailing region of interest located adjacent to a trailing end of the powder distributor 108. As such, the regions of interest may be selected based on a location of the powder distributor 108. The location of the powder distributor 108 may be determined using one or more programming instructions included within the powder distributor recognition logic 372. That is, the powder distributor recognition logic 372 includes one or more programming instructions that determine a location of the powder distributor based on one or more characteristics of pixels from the image data that correspond to characteristics of the powder distributor 108. For example, the various pixels from the image data that correspond to the characteristics of the powder distributor 108 may have a different color, a different brightness, a different intensity, a different temperature, and/or the like relative to pixels corresponding to the powder layer 112.

The comparison logic 370 generally includes one or more programming instructions for comparing the characteristics of the selected one or more points at various intervals in time. That is, the comparison logic 370 may contain compare characteristics of the one or more points when the one or more points are located within a first region of interest (e.g., the leading region of interest) with the one or more points later in time when the one or more points are located within a second region of interest (e.g., the trailing region of interest). More specifically, the comparison logic 370 may contain programming instructions usable to determine differences in characteristics such as color, intensity, brightness, temperature, gradients, and/or the like for the purposes of comparing.

Referring to FIGS. 1A-1B, 3A, and 3C, the device interface logic 374 includes one or more programming instructions for establishing communicative connections with the various devices or components of the additive manufacturing system 100 (FIG. 1A) or the additive manufacturing system 100' (FIG. 1B). For example, the device interface logic 374 may include programming instructions usable to establish connections with the powder distributor 108 and/or the emitter 130 in various embodiments. In another example, the device interface logic 374 may contain programming instructions for working in tandem with the programming instructions of the image data receiving logic 360 to establish connections with the imaging device 114 (FIG. 1A) or the imaging devices 114a, 114b (FIG. 1B).

Referring again to FIG. 3A, the network interface hardware 308 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 308 may be used to facilitate communication between external storage devices, user computing devices, server computing devices, external control devices, and/or the like via a network, such as, for example, a local network, the Internet, and/or the like.

The device interface hardware 310 may communicate information between the local interface 300 and one or more components of the additive manufacturing system 100 of FIG. 1A or the additive manufacturing system 100' of FIG. 1B. For example, the device interface hardware 310 may act as an interface between the local interface 300 and the imaging device 114 of FIG. 1A or the plurality of imaging devices 114a, 114b of FIG. 1B, the powder distributor 108, a dynamic optical component controller 312 that controls the dynamic optical element 118 of FIG. 1B, and/or the like. In some embodiments, the device interface hardware 310 may transmit or receive signals and/or data to/from the imaging device 114 of FIG. 1A or the plurality of imaging devices 114a, 114b of FIG. 1B, transmit control signals to the dynamic optical component controller 312 to effect control of the dynamic optical element 118 of FIG. 1B, and/or the like.

Still referring to FIG. 3A, the data storage component 306, which may generally be a storage medium, may contain one or more data repositories for storing data that is received and/or generated. The data storage component 306 may be any physical storage medium, including, but not limited to, a hard disk drive (HDD), memory, removable storage, and/or the like. While the data storage component 306 is depicted as a local device, it should be understood that the data storage component 306 may be a remote storage device, such as, for example, a server computing device, cloud based storage device, or the like. Illustrative data that may be contained within the data storage component 306 includes, but is not limited to, image data 322, machine learning (ML) data 324, and/or other data 326. The image data 322 may generally be data that is used by the control component 120 to recognize particular objects, determine one or more points on the powder layer 112 (FIGS. 1A-1B), monitor an amount of electromagnetic radiation at the one or more points, determine a change in electromagnetic radiation, and/or the like. For example, the control component 120 may access the image data 322 to obtain a plurality of images received from the imaging device 114 (FIG. 1A) or the plurality of imaging devices 114a, 114b (FIG. 1B), determine an amount of electromagnetic radiation from the image data 322, and generate one or more commands accordingly. Still referring to FIG. 3A, the ML data 324 may be data that is generated as a result of one or more machine learning processes used to determine features of the powder layer 112 (FIGS. 1A-1B) from the image data 322. Still referring to FIG. 3A, the other data 326 may generally be any other data that is usable for the purposes of determining characteristics from the image data 322, selecting one or more points, identifying the powder distributor 108 (FIGS. 1A-1B), locating one or more points, providing feedback, directing movement, and/or the like, as described herein.

It should be understood that the components illustrated in FIG. 3A are merely illustrative and are not intended to limit the scope of this disclosure. More specifically, while the components in FIG. 3A are illustrated as residing within the control component 120, this is a nonlimiting example. In some embodiments, one or more of the components may reside external to the control component 120.

Figure 3B:
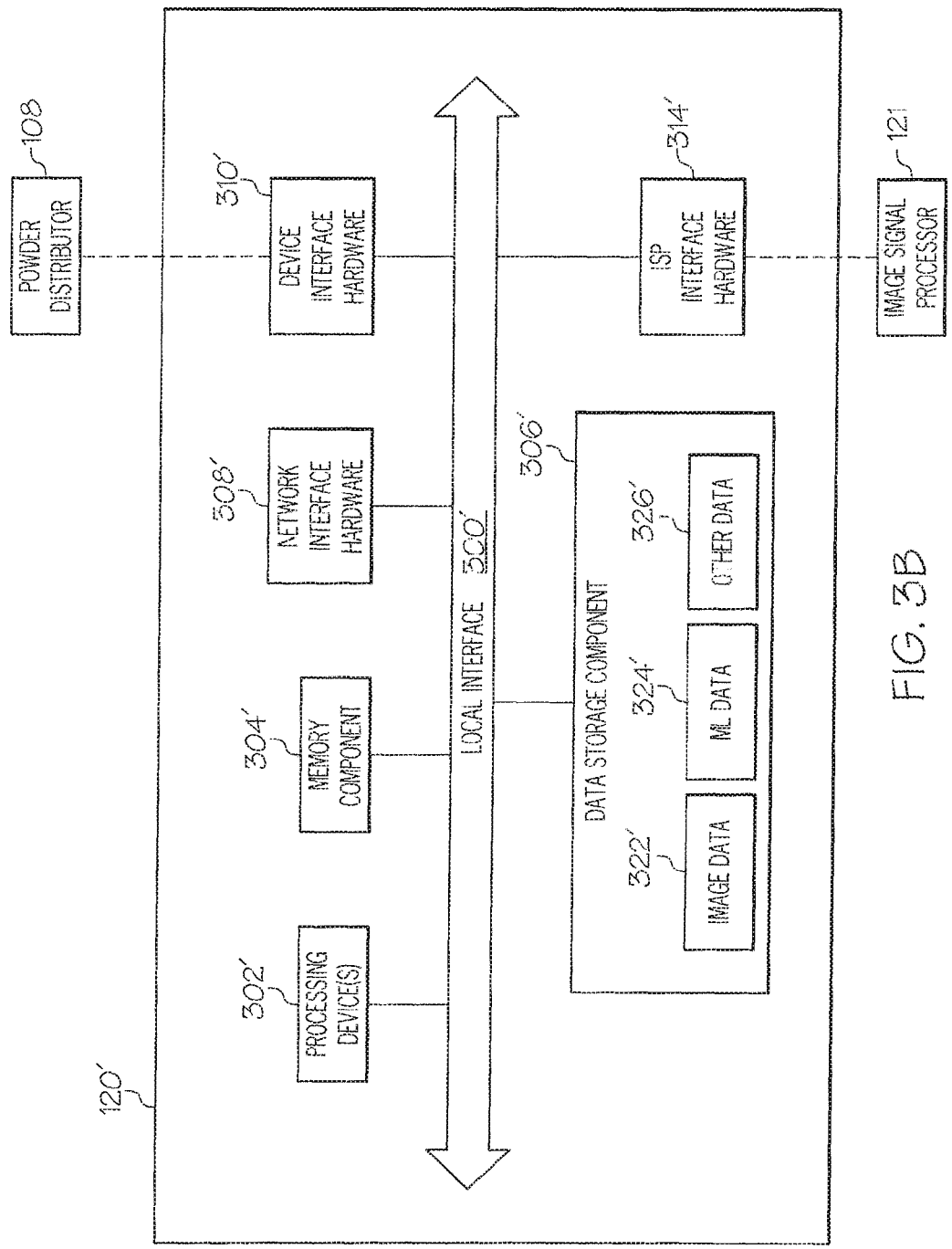
FIG. 3B depicts a block diagram of illustrative internal components of a control component that is utilized to analyze image data and/or assist with control of the additive manufacturing system of FIG. 1C according to one or more embodiments shown and described herein.
Figure 3C:
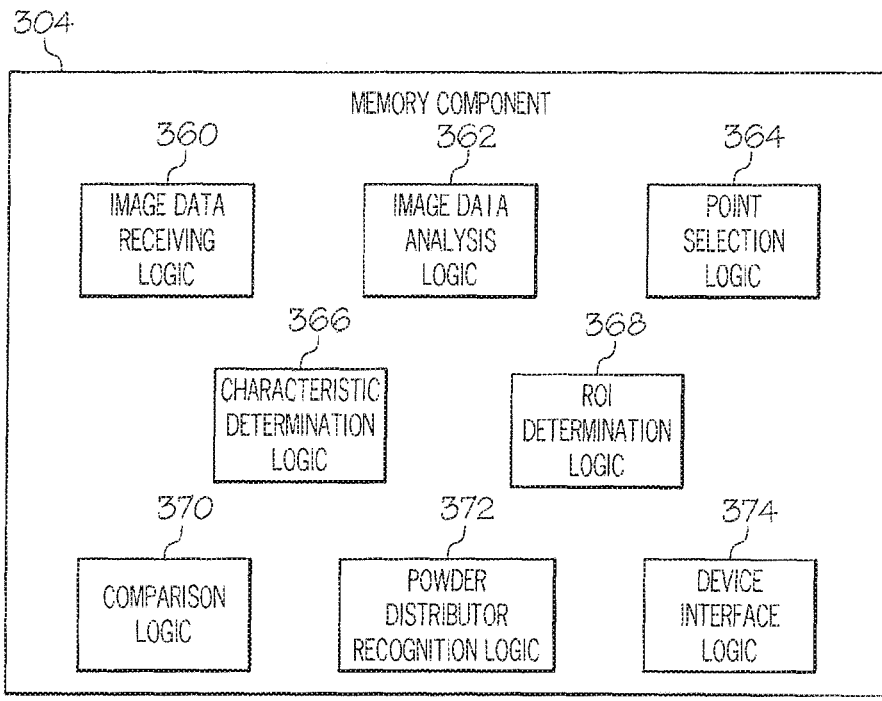
FIG. 3C depicts a block diagram of illustrative logic modules contained within a memory component of the control component of FIG. 3A according to one or more embodiments shown and described herein.

FIG. 3B depicts the various internal components of the control component 120' depicted in FIG. 1C. Particularly, FIG. 3B depicts various system components for analyzing image data received from the image signal processor 121 and/or assisting with the control of various components of the additive manufacturing system 100" depicted in FIG. 1C.

As illustrated in FIG. 3B, the control component 120' may include one or more processing devices 302', a non-transitory memory component 304', network interface hardware 308', device interface hardware 310', image signal processor (ISP) interface hardware 314', and a data storage component 306'. A local interface 300', such as a bus or the like, may interconnect the various components.

The one or more processing devices 302', such as a computer processing unit (CPU), may be the central processing unit of the control component 120', performing calculations and logic operations to execute a program. The one or more processing devices 302', alone or in conjunction with the other components, are illustrative processing devices, computing devices, processors, or combinations thereof. The one or more processing devices 302' may include any processing component configured to receive and execute instructions (such as from the data storage component 306' and/or the memory component 304').

The memory component 304' may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 304' may include one or more programming instructions thereon that, when executed by the one or more processing devices 302', cause the one or more processing devices 302' to complete various processes, such as the processes described herein with respect to FIG. 8.

Figure 3D:
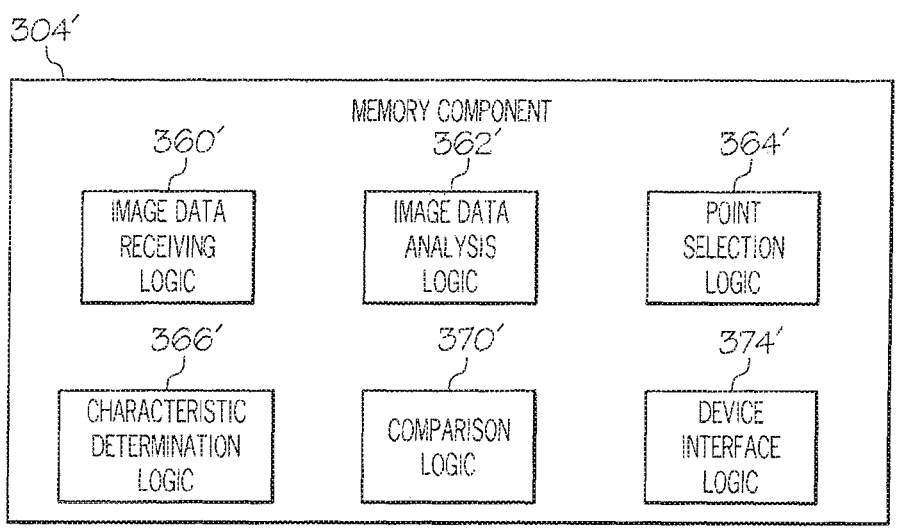
FIG. 3D depicts a block diagram of illustrative logic modules contained within a memory component of the control component of FIG. 3B according to one or more embodiments shown and described herein.

Still referring to FIG. 3B, the programming instructions stored on the memory component 304' may be embodied as a plurality of software logic modules, where each logic module provides programming instructions for completing one or more tasks. FIG. 3D depicts the various modules of the memory component 304' of FIG. 3B according to various embodiments.

As shown in FIG. 3D, the memory component includes a plurality of logic modules. Each of the logic modules shown in FIG. 3D may be embodied as a computer program, firmware, or hardware, as an example. Illustrative examples of logic modules present in the memory component 304' include, but are not limited to, image data receiving logic 360', image data analysis logic 362', point selection logic 364', characteristic determination logic 366', comparison logic 370', and/or device interface logic 374'.

Referring to FIGS. 3B and 3D, the image data receiving logic 360' includes one or more programming instructions for receiving image data from the image signal processor 121. That is, the image data receiving logic 360' may cause a connection between the ISP interface hardware 314' and image signal processor 121 such that data transmitted by the image signal processor 121 is received by the control component 120'. Further, the data transmitted by the image signal processor 121 may be stored (e.g., within the data storage component 306').

The image data analysis logic 362' includes one or more programming instructions for analyzing image data received from the image signal processor 121. That is, the image data analysis logic 362' contains programming for analyzing pixels contained within image data (including leading image data and trailing image data), determining groupings of pixels based on various characteristics, extracting information from pixels (e.g., brightness, intensity, color, and/or the like), and/or completing other image analysis tasks now known or later developed.

Referring to FIGS. 1C and 3D, the point selection logic 364' includes one or more programming instructions for selecting one or more points on the powder layer 112 from the image data for the purposes of analyzing changes to the one or more points, as described in greater detail herein. That is, the point selection logic 364' may contain programming for determining one or more pixels from the image data that correspond to one or more points on the powder layer 112 based on characteristics of the pixels that are indicative of points on the powder layer 112. The point selection logic 364' may further include programming instructions for determining that the selected one or more points are located in a leading region of interest or in a location where a leading region of interest will be at a future point in time based on the type of image data received (e.g., leading image data or trailing image data). In some embodiments, the one or more selected points may be assigned a location identifier such that the one or more points can later be determined in subsequent image data. For example, each one of the one or more points may be assigned coordinates relative to one or more fixed areas in the image data such that the points can be located at the same coordinates in subsequent image data. That is, if a particular point is located 82 pixels up and 17 pixels to the right from a known fixed location in the image data (regardless of the optical fibers that imaged the point), the point may be assigned coordinates of (17, 82) or the like. Other location identifiers should generally be understood.

Still referring to FIGS. 1C and 3D, the characteristic determination logic 366' includes one or more programming instructions for determining characteristics of the selected one or more points that have been selected according to the point selection logic 364'. That is, the characteristic determination logic 366' may contain programming usable to determine characteristics of the powder layer at the one or more points based on the image data of the pixels at the one or more points. For example, the characteristic determination logic 366' may contain programming for determining characteristics such as brightness, intensity, color, and/or the like. In some embodiments, the characteristic determination logic 366' may contain programming that is usable to determine information pertaining to spatial temperature gradients at the one or more points and/or temporal temperature gradients at the one or more points.

The comparison logic 370' generally includes one or more programming instructions for comparing the characteristics of the selected one or more points at various intervals in time. That is, the comparison logic 370' may contain compare characteristics of the one or more points when the one or more points are located within first image data (e.g., leading image data) with the one or more points later in time when the one or more points are located within second image data (e.g., trailing image data). More specifically, the comparison logic 370' may contain programming instructions usable to determine differences in characteristics such as color, intensity, brightness, temperature, gradients, and/or the like for the purposes of comparing.

Referring to FIGS. 1C, 3B, and 3D, the device interface logic 374' includes one or more programming instructions for establishing communicative connections with the various devices or components of the additive manufacturing system 100". For example, the device interface logic 374' may include programming instructions usable to establish connections with the powder distributor 108 and/or the emitter 130 in various embodiments. In another example, the device interface logic 374' may contain programming instructions for working in tandem with the programming instructions of the image data receiving logic 360' to establish connections with the image signal processor 121.

Referring again to FIG. 3B, the network interface hardware 308' may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 308' may be used to facilitate communication between external storage devices, user computing devices, server computing devices, external control devices, and/or the like via a network, such as, for example, a local network, the Internet, and/or the like.

The device interface hardware 310' may communicate information between the local interface 300' and one or more components of the additive manufacturing system 100" of FIG. 1C. For example, the device interface hardware 310' may act as an interface between the local interface 300' and the powder distributor 108 and/or the like. In some embodiments, the device interface hardware 310' may transmit or receive signals and/or data to/from the powder distributor 108 to cause the powder distributor 108 to move, stop, reverse direction, and/or the like, as described herein.

Still referring to FIG. 3B, the data storage component 306', which may generally be a storage medium, may contain one or more data repositories for storing data that is received and/or generated. The data storage component 306' may be any physical storage medium, including, but not limited to, a hard disk drive (HDD), memory, removable storage, and/or the like. While the data storage component 306' is depicted as a local device, it should be understood that the data storage component 306' may be a remote storage device, such as, for example, a server computing device, cloud based storage device, or the like. Illustrative data that may be contained within the data storage component 306' includes, but is not limited to, image data 322', machine learning (ML) data 324', and/or other data 326'. The image data 322' may generally be data that is used by the control component 120' to recognize particular objects, determine one or more points on the powder layer 112 (FIG. 1C), monitor an amount of electromagnetic radiation at the one or more points, determine a change in electromagnetic radiation, and/or the like. For example, the control component 120' may access the image data 322' to obtain a plurality of images received from the image signal processor 121, determine an amount of electromagnetic radiation from the image data 322', and generate one or more commands accordingly. Still referring to FIG. 3B, the ML data 324' may be data that is generated as a result of one or more machine learning processes used to determine features of the powder layer 112 (FIG. 1C) from the image data 322'. Still referring to FIG. 3B, the other data 326' may generally be any other data that is usable for the purposes of determining characteristics from the image data 322', selecting one or more points, locating one or more points, providing feedback, directing movement, and/or the like, as described herein.

It should be understood that the components illustrated in FIG. 3B are merely illustrative and are not intended to limit the scope of this disclosure. More specifically, while the components in FIG. 3B are illustrated as residing within the control component 120', this is a nonlimiting example. In some embodiments, one or more of the components may reside external to the control component 120'.

The various embodiments depicted in FIGS. 1A-1C, 2, and 3A-3D should now generally be understood. That is, the embodiment depicted in FIG. 1A includes an imaging device 114 located outside the build chamber 102 and fixed in a particular location such that it does not move and has a field of view that encompasses the entire powder bed 110. The embodiment depicted in FIG. 1B includes a plurality of imaging devices 114a, 114b optically coupled to a dynamic optical element 118 outside the build chamber 102 and arranged such that each of the plurality of imaging devices has a particular field of view that is movable by the dynamic optical element 118. The embodiment depicted in FIG. 1C and FIG. 2 includes a plurality of leading optical fibers 109a and a plurality of trailing optical fibers 109b arranged on the powder distributor 108 and optically coupled to the image signal processor 121, which processes the signals. In each of the embodiments depicted in FIGS. 1A-1C, it is possible to image the powder layer 112 immediately before and immediately after passing the powder distributor 108 over the powder layer 112 and comparing the images to determine a distribution of the powder layer 112 using the various internal components described with respect to FIGS. 3A-3D and described in further detail below.

In operation, the functionality of some components of the additive manufacturing systems 100, 100', 100" may be similar in each of the embodiments depicted in FIGS. 1A-1C. That is, during a work cycle, the build platform 111 may be lowered successively in relation to the emitter 130 (e.g., in the −y direction of the coordinate axes depicted in FIGS. 1A-1C) after each added powder layer 112 is placed. This means that the build platform 111 starts in an initial position, in which a first powder layer 112 of a particular thickness is laid down on the build platform. In some embodiments, the first powder layer 112 may be thicker than the other applied layers, so as to avoid a melt-through of the first layer onto the build platform 111. The build platform 111 is thereafter lowered in connection with laying down a second powder layer 112 for the formation of a new cross section of the article 142.

In an example embodiment, the article 142 may be formed through successive fusion of layers the raw material 141 supplied from the raw material hoppers 140a, 140b on the build platform 111 (e.g., successive fusion of layers of powder layer 112). Each layer corresponds to successive cross sections of the article 142. Such a fusion may be particularly completed based on instructions generated from a model the article 142. In some embodiments, the model may be generated via a CAD (Computer Aided Design) tool.

In embodiments, the emitter 130 generates an electron beam that, when contacting the raw material 141 located on the build platform, melts or fuses together the raw material 141 to form a first layer of the powder layer 112 on the build platform 111. In some embodiments, the control component 120 may be used for controlling and managing the electron beam emitted from the emitter 130. At least one focusing coil (not shown), at least one deflection coil, and an electron beam power supply may be electrically connected or communicatively coupled to the control component 120, as indicated by the dashed lines between the control component 120, 120' and the emitter 130 in each of FIGS. 1A-1C. In an illustrative embodiment, the emitter 130 generates a focusable electron beam with an accelerating voltage of about 60 kilovolts (kV) and with a beam power in the range of about 0 kilowatts (kW) to about 3 kW. A pressure in the interior 104 of the build chamber 102 may be in the range of about $10^{-3}$ millibars (mBar) to about $10^{-6}$ mBar when constructing the article 142 by fusing each successive powder layer 112 with the energy beam.

In embodiments, a particular amount of raw material 141 may be provided on the build platform 111. The particular amount of raw material 141 is provided on the build platform 111 from one or more of the raw material hoppers 140a, 140b, in which the raw material 141 is ejected through the respective outlets on the raw material hoppers 140a, 140b, thereby creating a screen of raw material 141 on the build platform 111 (as well as the unfused raw material 141 on either side of the build platform 111).

It should be understood that the use and arrangement of the raw material hoppers 140a, 140b to supply the raw material 141 used for forming the powder layer 112 described herein is merely illustrative. That is, other arrangements of supplying and providing raw material 141, such as a powder container with a moving floor located outside the build chamber 102 or the like is also contemplated and included within the scope of the present disclosure.

In embodiments, a layer from the raw material 141 may be provided on build platform 111. The layer from the raw material 141 may then be collected by the powder distributor 108 by moving the powder distributor 108 a particular distance in a first direction (e.g., in a direction along the plane formed by the x-axis and the z-axis of the coordinate axes depicted in FIGS. 1A-1C) into the scree of the raw material 141, thereby allowing a particular amount of the raw material 141 to fall over a top of the powder distributor 108. The powder distributor 108 is then moved in a second direction (e.g., in another direction along the plane formed by the x-axis and the z-axis of the coordinate axes depicted in FIGS. 1A-1C). In some embodiments, the second direction may be opposite to the first direction. Movement of the powder distributor 108 in the second direction may remove the particular amount of the raw material 141, which has fallen over the top of the powder distributor 108, from the scree of the raw material 141.

The particular amount of the raw material 141 removed from the scree of the raw material 141 (or provided by any other suitable mechanism) in front of the powder distributor 108 (e.g., adjacent to a leading end of the powder distributor 108) may be moved over the powder bed 110 and/or the build platform 111 by means of the powder distributor 108 (including the rake teeth 107 thereof), thereby distributing the particular amount of the raw material 141 over the build platform 111.

In embodiments, a distance between a lower part of the rake teeth 107 and the upper part of the build platform 111 or a previous powder layer 112 determines the thickness of the portion of the raw material 141 distributed over the build platform 111 or the previous powder layer 112. That is, a thickness of the powder layer 112 can be adjusted by adjusting the height of the build platform 111.

The energy beam 131 emitted from the emitter 130 may be directed over the build platform 111, thereby causing the powder layer 112 to fuse in particular locations to form a first cross section of the article 142 according to the model generated via the CAD tool. As noted herein, the energy beam 131 may be an electron beam or a laser beam. The energy beam 131 is directed over the build platform 111 from instructions given by the control component 120 or another device.

After a first powder layer 112 is finished (e.g., after the fusion of raw material for making a first layer of the article 142), a second powder layer 112 is provided on the first powder layer 112. The second powder layer 112 may be distributed according to the same manner as the previous layer, as described herein. However, in some embodiments, there might be alternative methods in the same additive manufacturing machine for distributing the raw material 141. For instance, a first layer may be provided by means of a first powder distributor and a second layer may be provided by a second powder distributor.

After the second powder layer 112 is distributed on the first powder layer 112, the energy beam 131 is directed over the build platform 111, causing the second powder layer 112 to fuse in selected locations to form a second cross section of the article 142. Fused portions in the second layer may be bonded to fused portions of said first layer. The fused portions in the first and second layer may be melted together by melting not only the material in the uppermost layer but also remelting at least a portion of a thickness of a layer directly below the uppermost layer.

In order to ensure each powder layer 112 is adequately distributed prior to application of the energy beam 131, the powder layer 112 may be imaged according to the various embodiments described herein. Inadequate distribution of the powder layer may cause a malformation of a cross section of the article 142. As such, the embodiments described herein are configured to image the powder layer 112 before and after the powder distributor 108 is passed over the powder layer 112. If an inadequate distribution of the powder layer is sensed, corrective action can be taken prior to application of the energy beam 131 so as to ensure better distribution. Corrective action may include passing the powder distributor 108 over the powder layer 112 one or more additional times, providing more of the raw material 141, and/or the like.

Figure 4A:
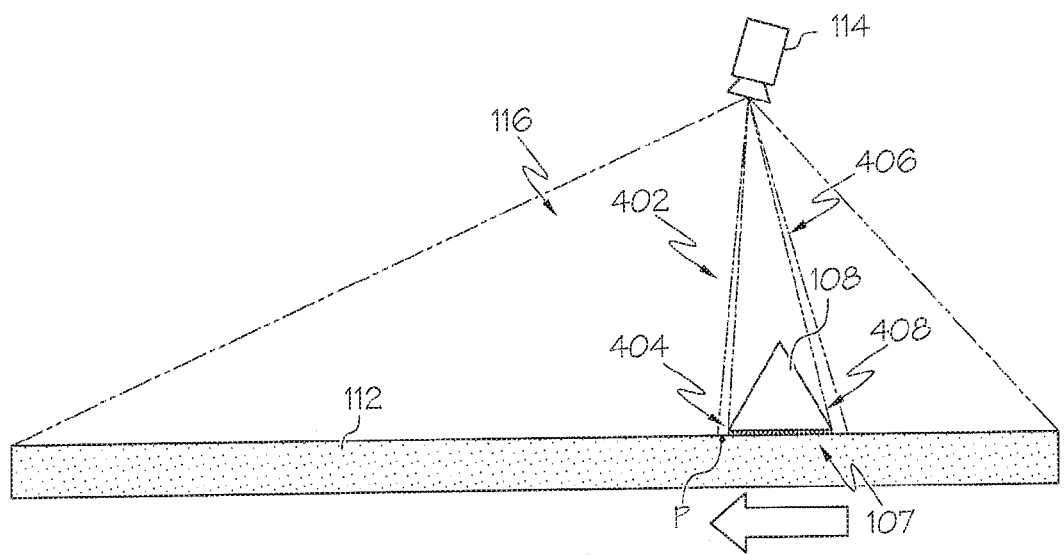
FIG. 4A schematically depicts imaging of a leading region of interest and a trailing region of interest using the additive manufacturing system depicted in FIG. 1A when a powder distributor is located in a first location according to one or more embodiments shown and described herein.
Figure 4B:
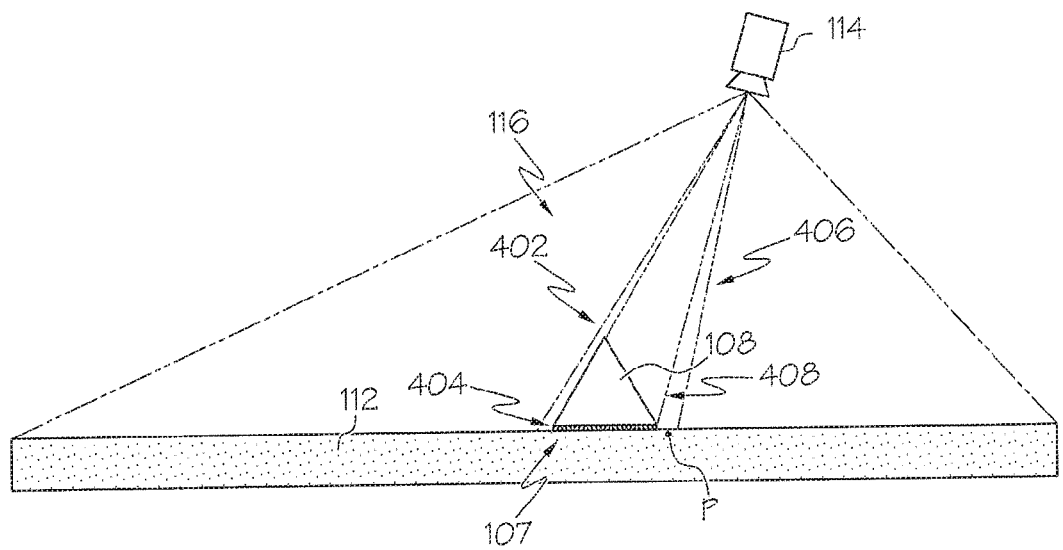
FIG. 4B schematically depicts imaging of the leading region of interest and the trailing region of interest using the additive manufacturing system depicted in FIG. 1A when the powder distributor is located in a second location according to one or more embodiments shown and described herein.

FIGS. 4A and 4B schematically depict a method of monitoring the powder layer using the embodiment depicted in FIG. 1A. As shown in FIGS. 4A-4B, the imaging device 114 is positioned so as to image the powder bed 110. That is, the field of view 116 of the imaging device 114 encompasses the entire powder bed 110. Also depicted in FIGS. 4A-4B is the powder distributor 108 moving over the powder bed 110, as indicated by the directional arrow pointing to the left. The powder distributor has a first end 404 and a second end 408. The first end 404 as shown in the embodiment of FIG. 4A is a leading end that represents the first portion of the powder distributor 108 to reach a particular area due to the movement of the powder distributor 108 in the direction to the left. In addition, the second end 408 as shown in the embodiment of FIG. 4A is a trailing end that represents the last portion of the powder distributor 108 to reach the particular area due to the movement of the powder distributor 108 in the direction to the left. In the embodiment depicted in FIG. 4A, the leftwards movement of the powder distributor 108 results in the first end 404 (e.g., the leading end) being on a leftmost portion of the powder distributor 108 and the second end 408 (e.g., the trailing end) being on a rightmost portion of the powder distributor 108. However, it should be understood that if the powder distributor 108 is moving in a different direction, the location of the leading end and the trailing end thereof may change. For example, if the powder distributor 108 moves from left to right (e.g., in a direction opposite of what is depicted in FIG. 4A), then the first end 404 would represent the trailing end and the second end 408 would represent the leading end.

FIGS. 4A-4B also depict a point P, which represents one of the one or more selected points on the powder bed 110, as described herein. The point P does not move. That is, the point P remains in the same location throughout the imaging process. Thus, as shown in FIG. 4A, the point P is located near or adjacent to the first end 404 (e.g., the leading end) of the powder distributor 108. As the powder distributor 108 moves in the left direction of the arrow depicted in FIG. 4A, the first end 404 (e.g., the leading end) and the second end 408 (e.g., the trailing end) of the powder distributor 108 also move. As a result of the movement, point P becomes near or adjacent to the second end 408 (e.g., the trailing end) of the powder distributor 108 after the powder distributor 108 moves left to the position depicted in FIG. 4B.

As described herein, point P (which may be among other points) is selected and analyzed using the image data from the imaging device 114. However, image data produced by the imaging device 114, if transmitted and analyzed using the entire field of view 116, would be rather unwieldy and require a large amount of processing power and storage for the purposes of analyzing the powder layer. Accordingly, referring to FIGS. 3C and 4A-B, the ROI determination logic 368 may be used to programmatically determine a leading region of interest 402 within the field of view 116 of the imaging device 114 from the image data provided by the imaging device 114, the leading region of interest 402 being located adjacent to the first end 404 (e.g., the leading end) of the powder distributor 108. In addition, the ROI determination logic 368 may also be used to programmatically determine a trailing region of interest 406 within the field of view 116 of the imaging device 114 from the image data provided by the imaging device 114, the trailing region of interest 406 being located adjacent to the second end 408 (e.g., the trailing end) of the powder distributor 108.

The leading region of interest 402 is selected to obtain information from the image data of the powder layer 112 just before the powder distributor 108 passes over the powder layer 112 without the need to analyze all of the image data corresponding to the entire field of view 116 of the imaging device 114. In addition, the trailing region of interest 406 is selected to obtain information from the image data of the powder layer 112 just after the powder distributor 108 passes over the powder layer 112 without the need to analyze all of the image data corresponding to the entire field of view 116 of the imaging device 114.

The size of the leading region of interest 402 and the trailing region of interest 406 is not limited by the present disclosure, and any size that is sufficiently large enough to analyze one or more points adjacent to the first end 404 (e.g., the leading end) and the second end 408 (e.g., the trailing end) of the powder distributor 108 can be used. In some embodiments, the leading region of interest 402 and the trailing region of interest 406 may each be a strip extending outwardly from the powder distributor and having a width of one or more pixels.

Given the high speed readout of the data generated by the imaging device 114, particularly in embodiments where the imaging device 114 is an area scan camera, selection of the leading region of interest 402 and the trailing region of interest 406 allows for a quick analysis of the image data in the leading region of interest 402 and the trailing region of interest 406 relative to an amount of time that would be necessary if the entire field of view 116 of the imaging device 114 was analyzed.

It should be appreciated that movement of the powder distributor 108 as depicted in FIG. 4A results in movement of the leading region of interest 402 and the trailing region of interest 406. As such, the programming in the powder distributor recognition logic 372 may be used to recognize the location of the powder distributor 108 and determine a corresponding location of the leading region of interest 402 and the trailing region of interest 406 to be analyzed.

Once the point P is located within the leading region of interest 402 due to movement of the powder distributor 108 as shown in the embodiment of FIG. 4A, one or more characteristics of the powder layer 112 at point P are determined. The characteristics include, but are not limited to, color, brightness, intensity, temperature, and/or the like. In some embodiments, the control component 120 may determine a heat radiation of the powder layer 112 at point P.

As the powder distributor 108 moves to the location depicted in FIG. 4B, point P on the powder layer 112 is now located within the trailing region of interest 406. The one or more characteristics of the powder layer 112 at point P are once again determined such that a comparison can be made as to a difference, thereby indicating a spatial and temporal temperature gradient, which, in turn, can be used to determine how adequately the powder layer 112 was spread by the rake teeth 107 of the powder distributor 108.

Figure 5A:
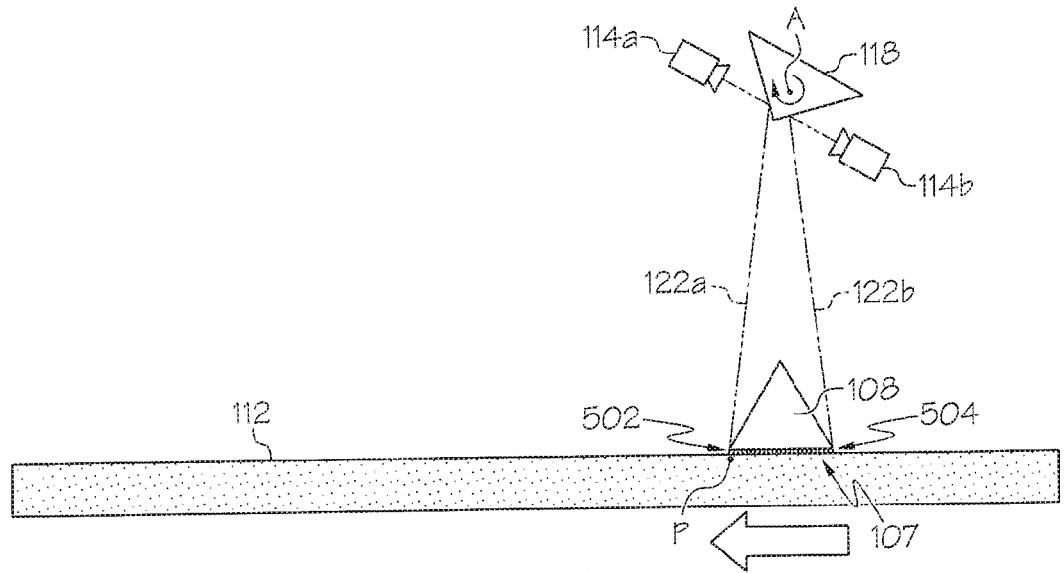
FIG. 5A schematically depicts imaging of the leading region of interest and the trailing region of interest using the additive manufacturing system depicted in FIG. 1B when the powder distributor is located in a first location according to one or more embodiments shown and described herein.
Figure 5B:
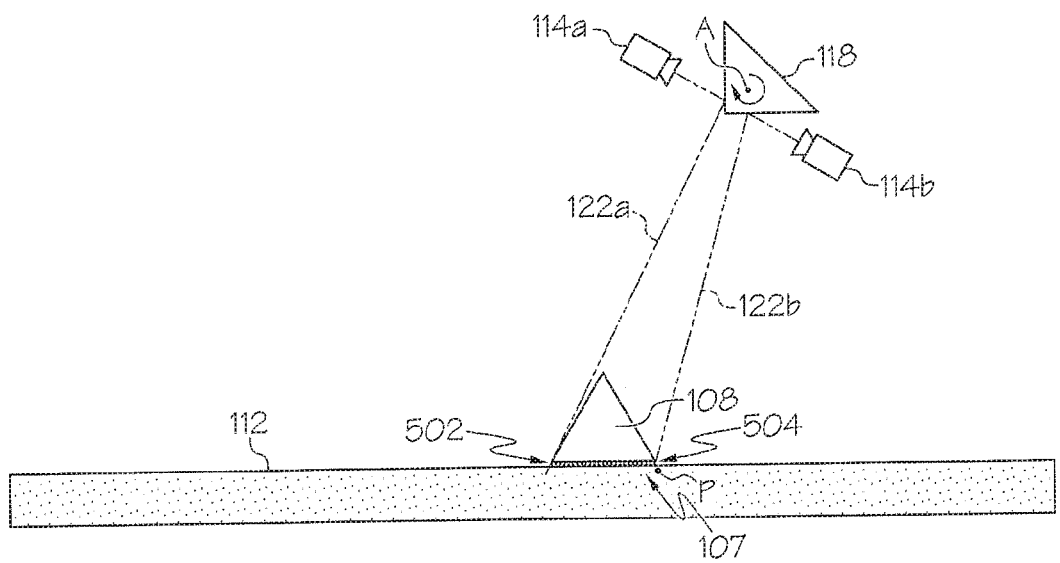
FIG. 5B schematically depicts imaging of the leading region of interest and the trailing region of interest using the additive manufacturing system depicted in FIG. 1B when the powder distributor is located in a second location according to one or more embodiments shown and described herein.

FIGS. 5A and 5B schematically depict a method of monitoring the powder layer using the embodiment depicted in FIG. 1B. As shown in FIGS. 5A-5B, the imaging devices 114a, 114b and the dynamic optical element 118 are positioned such that the imaging devices 114a, 114b are optically coupled to the dynamic optical element 118 and such that the field of view 122a of a first imaging device 114a is altered (e.g., reflected) by the dynamic optical element 118 to extend to a leading region of interest proximate a first end 502 of the powder distributor 108 and the field of view 122b of a second imaging device 114b is altered (e.g., reflected) by the dynamic optical element 118 to extend to a trailing region of interest proximate a second end 504 of the powder distributor 108.

Also depicted in FIGS. 5A-5B is the powder distributor 108 moving over the powder bed 110, as indicated by the directional arrow pointing to the left. The powder distributor 108 includes the first end 502 and the second end 504. The first end 502 as shown in the embodiment of FIG. 5A is a leading end that represents the first portion of the powder distributor 108 to reach a particular area due to the movement of the powder distributor 108 in the direction to the left. In addition, the second end 504 as shown in the embodiment of FIG. 5A is a trailing end that represents the last portion of the powder distributor 108 to reach a particular area due to the movement of the powder distributor 108 in the direction to the left. In the embodiment depicted in FIG. 5A, the leftwards movement of the powder distributor 108 results in the leading end (e.g., the first end 502) being on a leftmost portion of the powder distributor 108 and the trailing end (e.g., the second end 504) being on a rightmost portion of the powder distributor 108. However, it should be understood that if the powder distributor 108 is moving in a different direction, the location of the leading end and the trailing end thereof may change. For example, if the powder distributor 108 moves from left to right (e.g., in a direction opposite of what is depicted in FIG. 5A), then the leading end would be located at the first end 502 and the trailing end would be located at the second end 504.

FIGS. 5A-5B also depict a point P, which represents one of the one or more selected points on the powder bed 110, as described herein. The point P does not move. That is, the point P remains in the same location throughout the imaging process. Thus, as shown in FIG. 5A, the point P is located near or adjacent to the first end 502 (e.g., the leading end) of the powder distributor 108. As the powder distributor 108 moves according to the arrow depicted in FIG. 5A, the first end 502 (e.g., the leading end) and the second end 504 (e.g., the trailing end) of the powder distributor 108 also move. As a result of the movement, point P becomes near or adjacent to the second end 504 (e.g., the trailing end) of the powder distributor 108, as depicted in FIG. 5B.

As described herein, point P (which may be among other points) is selected and analyzed using the image data from the imaging devices 114a, 114b. As the dynamic optical element 118 moves to alter the location on the powder bed 110 of the first field of view 122a and the second field of view 122b, the respective fields of view 122a, 122b pass over the point P and collect image data therefrom.

As described herein, the dynamic optical element 118 rotates or otherwise moves or adjusts in concert with the movement of the powder distributor 108 such that the first field of view 122a and the second field of view 122b also move in concert with the powder distributor 108. As a result, the first field of view 122a is always arranged such that it is aimed at a region of interest proximate to the first end 502 of the powder distributor 108 as the powder distributor 108 moves. Likewise, the second field of view 122b is always arranged such that it is aimed at a region of interest proximate to the second end 504 of the powder distributor 108 as the powder distributor 108 moves.

Once the point P is located within the first field of view 122a at the first end 502 (e.g., the leading end) of the powder distributor 108 due to movement of the powder distributor 108 as shown in the embodiment of FIG. 5A, one or more characteristics of the powder layer 112 at point P are determined from the image data. The characteristics include, but are not limited to, color, brightness, intensity, temperature, and/or the like. In some embodiments, the control component 120 may determine a heat radiation of the powder layer 112 at point P.

As the powder distributor 108 moves to the location depicted in FIG. 5B, point P on the powder layer 112 is now located within the second field of view 122b at the second end 504 (e.g., the trailing end) of the powder distributor 108. The one or more characteristics of the powder layer 112 at point P are once again determined such that a comparison can be made as to a difference, thereby indicating a spatial and temporal temperature gradient, which, in turn, can be used to determine how adequately the powder layer 112 was spread by the rake teeth 107 of the powder distributor 108.

Figure 6A:
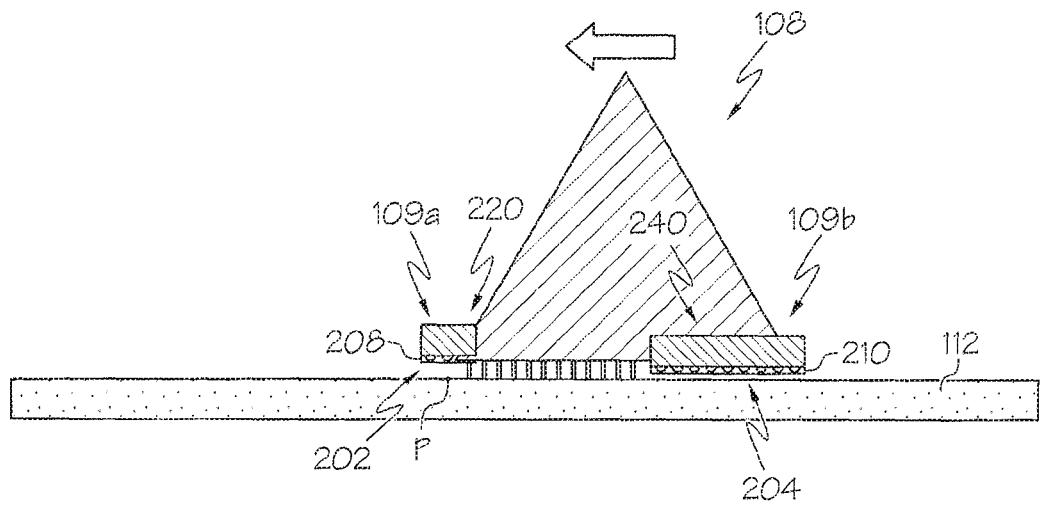
FIG. 6A schematically depicts imaging of the leading region of interest and the trailing region of interest using the additive manufacturing system depicted in FIG. 1C when the powder distributor is located in a first location according to one or more embodiments shown and described herein.
Figure 6B:
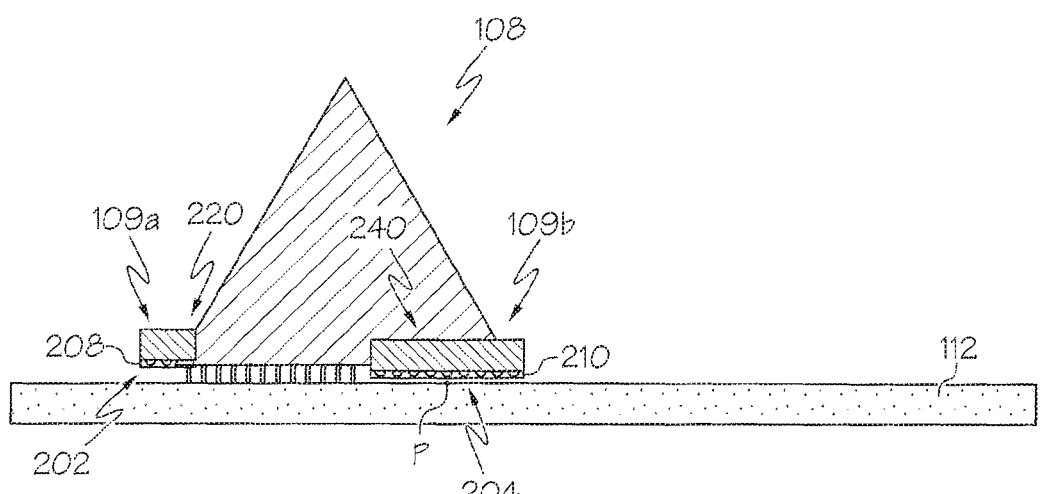
FIG. 6B schematically depicts imaging of the leading region of interest and the trailing region of interest using the additive manufacturing system depicted in FIG. 1C when the powder distributor is located in a second location according to one or more embodiments shown and described herein.

FIGS. 6A and 6B schematically depict a method of monitoring the powder layer using the embodiment depicted in FIG. 1C. As shown in FIGS. 6A-6B, the powder distributor 108 moves over the powder bed 110, as indicated by the directional arrow pointing to the left. The powder distributor 108 includes the leading optical fibers 109a located on the leading end 220 of the powder distributor 108 and the trailing optical fibers 109b located on the trailing end 240 of the powder distributor 108.

FIGS. 6A-6B also depict a point P, which represents one of the one or more selected points on the powder bed 110, as described herein. The point P does not move. That is, the point P remains in the same location throughout the imaging process. Thus, as shown in FIG. 6A, the point P is located near or adjacent to the leading optical fibers 109a located on the leading end 220 of the powder distributor 108. As the powder distributor 108 moves in the direction to the left according to the arrow depicted in FIG. 6A, the leading end 220 and the trailing end 240 of the powder distributor 108 also move. As a result of the movement, point P becomes near or adjacent to the trailing end 240 of the powder distributor 108, as depicted in FIG. 6B.

As described herein, point P (which may be among other points) is selected and analyzed using the image data from the optical fibers 109a, 109b as the leading end 220 and the trailing end 240 of the powder distributor 108 move over the powder bed 110. Once the point P is located within the a field of view of the leading optical fibers 109a of the powder distributor 108 due to movement of the powder distributor 108 as shown in the embodiment of FIG. 6A, one or more characteristics of the powder layer 112 at point P are determined from the image data. The characteristics include, but are not limited to, color, brightness, intensity, temperature, and/or the like. In some embodiments, the control component 120 may determine a heat radiation of the powder layer 112 at point P.

As the powder distributor 108 moves to the location depicted in FIG. 6B, point P on the powder layer 112 is now located within a field of view of the trailing optical fibers 109b of the powder distributor 108. The one or more characteristics of the powder layer 112 at point P are once again determined such that a comparison can be made as to a difference, thereby indicating a spatial and temporal temperature gradient, which, in turn, can be used to determine how adequately the powder layer 112 was spread by the rake teeth 107 of the powder distributor 108.

Figure 7:
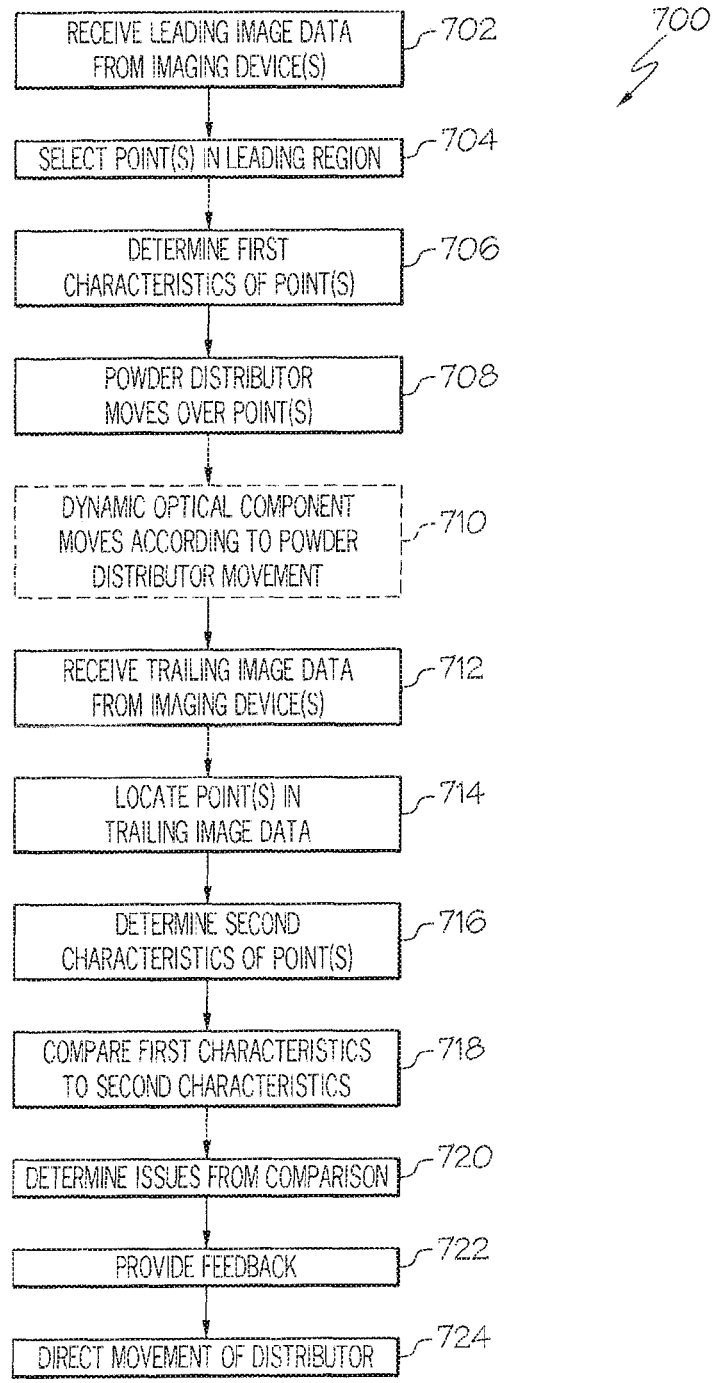
FIG. 7 depicts a flow diagram of an illustrative method of monitoring distribution of powder in an additive manufacturing system according to one or more embodiments shown and described herein.

FIG. 7 depicts an illustrative method 700 of imaging the powder layer 112 according to the embodiments depicted in FIGS. 1A-1B, 3A, 3C, 4A-4B, and 5A-5B. Accordingly, referring to FIGS. 1A-1B, 3A, 3C, 4A-4B, 5A-5B, and 7, leading image data is received from the imaging device 114 of FIG. 1A or the plurality of imaging devices 114a, 114b of FIG. 1B at block 702. The image data corresponds to one or more images of the powder bed 110 (including the powder layer 112) captured by the imaging device 114 or the plurality of imaging devices 114a, 114b at one or more points in time. The image data is generally received using the image data receiving logic 360 of the memory component 304 and the device interface hardware 310.

At block 704, one or more points (e.g., point P) on the powder layer 112 are selected from the image data for analysis. Such a selection may be completed, for example, by using the programming instructions in the point selection logic 364. As such, the one or more points (e.g., point P) may be randomly selected or may be selected such that particular areas of the powder layer 112 are particularly monitored for distribution. At block 706, one or more first characteristics (e.g., initial characteristics) of the one or more points (e.g., point P) may be determined. Such a determination may be completed, for example, by using the programming instructions in the image data analysis logic 362 and/or the characteristic determination logic 366.

It should be understood that the processes according to blocks 702-706 are generally completed in or near a leading end of the powder distributor 108 such that characteristics of the one or more points (e.g., point P) on the powder layer 112 are determined prior to the powder distributor passing over the one or more points (e.g., point P). As the powder distributor 108 continues to move, it passes over the one or more points (e.g., point P) in the powder layer at block 708.

At block 710, the dynamic optical element 118 moves according to the movement of the powder distributor 108. That is, in the embodiments containing the dynamic optical element 118 (e.g., the embodiments described herein with respect to FIG. 1B), movement of the powder distributor 108 is matched with corresponding movement of the dynamic optical element 118 so as to move the respective fields of view 122a, 122b so that the fields of view 122a, 122b remain aimed at the first end 502 and the second end 504, respectively, of the powder distributor 108. Since the process according to block 710 only occurs in certain embodiments, it is shown in dashed form to indicate the process is optional. In embodiments not containing the dynamic optical component, the process may move directly from block 708 to block 712.

At block 712, trailing image data is received from the imaging device 114 of FIG. 1A or the plurality of imaging devices 114a, 114b of FIG. 1B. The image data corresponds to one or more images of the powder bed 110 (including the powder layer 112) captured by the imaging device 114 or the plurality of imaging devices 114a, 114b at one or more points (e.g., point P) in time. The image data is generally received using the image data receiving logic 360 of the memory component 304 and the device interface hardware 310.

At block 714, the one or more points (e.g., point P) are located in the trailing image data received from the imaging device 114 of FIG. 1A or the plurality of imaging devices 114a, 114b of FIG. 1B. That is, the stored location data corresponding to each of the selected points (e.g., point P) is accessed (e.g., coordinates for each of the points), and the points are located in the trailing image data as the stored locations for each of the points come into the respective fields of view 116, 122a, 122b.

At block 716, one or more second characteristics (e.g., subsequent characteristics) of the one or more points (e.g., point P) may be determined. Such a determination may be completed, for example, by using the programming instructions in the image data analysis logic 362 and/or the characteristic determination logic 366. Thereafter, the first characteristics of the one or more points (e.g., point P) are compared to the second characteristics of the one or more points (e.g., point P) at block 718. That is, programming instructions according to the comparison logic 370 may be executed to determine a spatial gradient and/or a temporal gradient for each of the points (e.g., point P), thereby indicating how the characteristics of the points changed as the powder distributor 108 passed over the points, spreading the powder layer 112.

At block 720, any issues that may be present as a result of the comparison completed according to block 718 are determined. Issues may be present if a temperature gradient is determined from the comparison, as a temperature gradient may result from surface irregularities through the shadow formation caused by irregularities on a surface. Information of the temperature distribution is used partly to achieve a temperature distribution as smooth as possible across the parts of the surface layer, as the temperature distribution reflects the shape of the article 142 resulting from the processes described herein.

Regardless if issues are determined according to block 720, feedback may be provided at block 722. That is, if irregularities are determined based on observed temperature gradients, feedback indicative of the observed irregularities may be provided. If no irregularities are determined based on observed temperatures, feedback may be provided indicating that the powder layer 112 is adequately distributed and no further action is necessary by the powder distributor 108 prior to application of the energy beam 131 from the emitter 130. The feedback may be provided in the form of data that is stored for future use and/or in the form of instructions to complete additional steps, such as, for example, directing movement of the powder distributor 108 according to block 724.

Figure 8:
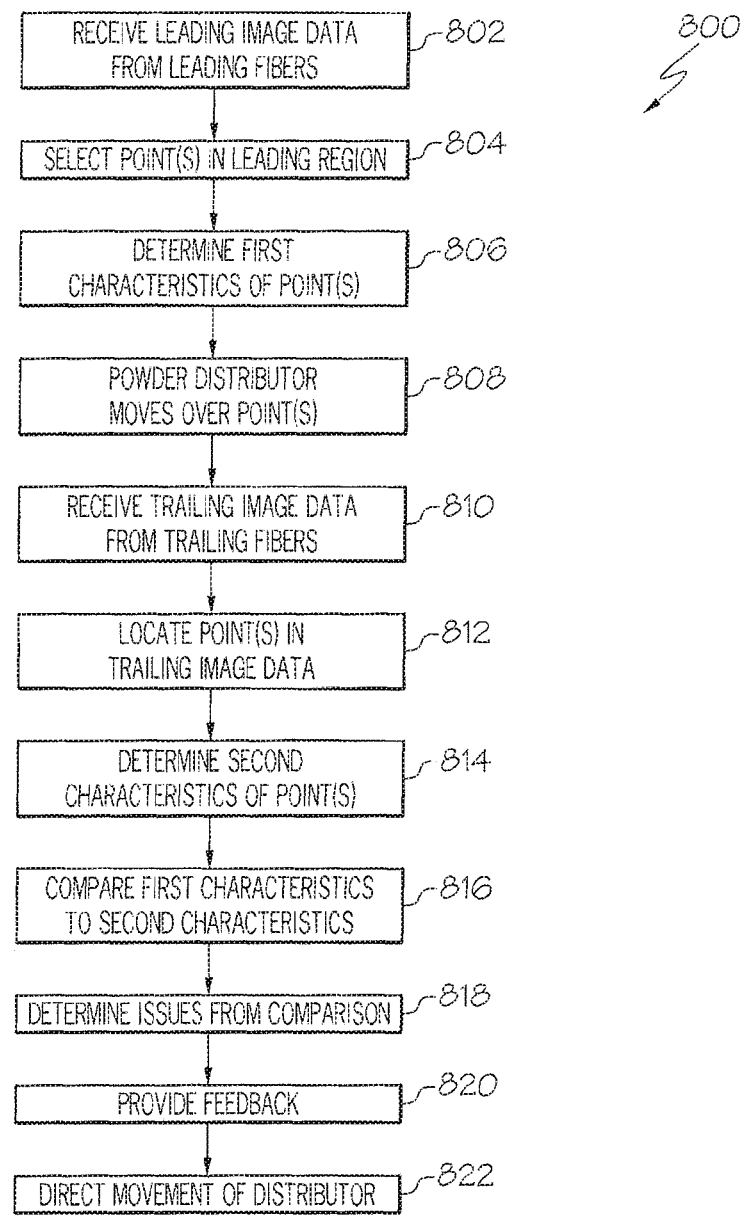
FIG. 8 depicts a flow diagram of another illustrative method of monitoring distribution of power in an additive manufacturing system according to one or more embodiments shown and described herein.

FIG. 8 depicts an illustrative method 800 of imaging the powder layer 112 according to the embodiments depicted in FIGS. 1C, 3B, 3D, and 6A-6B. Accordingly, referring to FIGS. 1C, 3B, 3D, 6A-6B, and 8, leading image data is received from the image signal processor 121 (which is data obtained via the leading optical fibers 109a) at block 802. The image data corresponds to one or more images of the powder bed 110 (including the powder layer 112) captured by the image signal processor 121 (via the leading optical fibers 109a) at one or more points in time. The image data is generally received using the image data receiving logic 360' of the memory component 304' and the ISP interface hardware 314'.

At block 804, one or more points (e.g., point P) on the powder layer 112 are selected from the image data for analysis. Such a selection may be completed, for example, by using the programming instructions in the point selection logic 364'. As such, the one or more points (e.g., point P) may be randomly selected or may be selected such that particular areas of the powder layer 112 are particularly monitored for distribution. At block 806, one or more first characteristics (e.g., initial characteristics) of the one or more points may be determined. Such a determination may be completed, for example, by using the programming instructions in the image data analysis logic 362' and/or the characteristic determination logic 366'.

It should be understood that the processes according to blocks 802-806 are generally completed in or near a leading end of the powder distributor 108 such that characteristics of the one or more points on the powder layer 112 (e.g., point P) are determined prior to the powder distributor passing over the one or more points. As the powder distributor 108 continues to move, it passes over the one or more points in the powder layer 112 (e.g., point P) at block 808.

At block 810, trailing image data is received from the image signal processor 121 (which is data obtained via the trailing optical fibers 109b). The image data corresponds to one or more images of the powder bed 110 (including the powder layer 112) captured by the image signal processor 121 (via the trailing optical fibers 109b) at one or more points in time. The image data is generally received using the image data receiving logic 360' of the memory component 304' and the ISP interface hardware 314'.

At block 812, the one or more points are located in the trailing image data. That is, the stored location data corresponding to each of the selected points is accessed (e.g., coordinates for each of the points), and the points are located in the trailing image data as the stored locations for each of the points come into the field of view of the trailing optical fibers 109b.

At block 814, one or more second characteristics (e.g., subsequent characteristics) of the one or more points (e.g., point P) may be determined. Such a determination may be completed, for example, by using the programming instructions in the image data analysis logic 362' and/or the characteristic determination logic 366'. Thereafter, the first characteristics of the one or more points (e.g., point P) are compared to the second characteristics of the one or more points at block 816. That is, programming instructions according to the comparison logic 370' may be executed to determine a spatial gradient and/or a temporal gradient for each of the points, thereby indicating how the characteristics of the points (e.g., point P) changed as the powder distributor 108 passed over the points, spreading the powder layer 112.

At block 818, any issues that may be present as a result of the comparison completed according to block 816 are determined. Issues may be present if a temperature gradient is determined from the comparison, as a temperature gradient may result from surface irregularities through the shadow formation caused by irregularities on a surface. Information of the temperature distribution is used partly to achieve a temperature distribution as smooth as possible across the parts of the surface layer, as the temperature distribution reflects the shape of the article 142 resulting from the processes described herein.

Regardless if issues are determined according to block 818, feedback may be provided at block 820. That is, if irregularities are determined based on observed temperature gradients, feedback indicative of the observed irregularities may be provided. If no irregularities are determined based on observed temperatures, feedback may be provided indicating that the powder layer 112 is adequately distributed and no further action is necessary by the powder distributor 108 prior to application of the energy beam 131 from the emitter 130. The feedback may be provided in the form of data that is stored for future use and/or in the form of instructions to complete additional steps, such as, for example, directing movement of the powder distributor 108 according to block 822.

It should now be understood that that the devices, systems, and methods described herein monitor the distribution of a powder layer supported by a powder bed in a build chamber of additive manufacturing system immediately before and after a powder distributor is passed over the powder layer to distribute the powder by analyzing any temperature gradients that may be observed, since the temperature gradients are indicative of an uneven spreading of powder material. Such devices, systems, and methods use one or more particularly configured imaging devices to achieve effective monitoring of the powder layer, including a single imaging device that only certain regions of interest are selected from a field of view, a combination of a plurality of imaging devices and a dynamic optical element, or a plurality of optical fibers coupled to trailing and leading ends of the powder distributor, the optical fibers optically coupled to an image signal processor that processes images. Any of these imaging devices can be used to determine whether the powder layer is appropriately distributed after application of the powder distributor, which can then be used to complete subsequent steps, such as passing the powder distributor over the powder layer one or more additional times.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A method of monitoring a powder layer distributed by a moving powder distributor in a build chamber, the method comprising: receiving, by a processing device, image data corresponding to a plurality of images of the powder layer supported by a powder bed within the build chamber from one or more imaging devices positioned to image the powder bed; determining, by the processing device, a leading region of interest located adjacent to a leading end of the moving powder distributor, the leading region of interest moving according to movement of the moving powder distributor; determining, by the processing device, a trailing region of interest located adjacent to a trailing end of the moving powder distributor, the trailing region of interest moving according to the moving powder distributor; selecting, by the processing device, at least one point on the powder bed that is located in the leading region of interest from the image data; determining, by the processing device, one or more first characteristics of the at least one point; when the at least one point is located within the trailing region of interest due to movement of the moving powder distributor, determining, by the processing device, one or more second characteristics of the at least one point; and comparing, by the processing device, the one or more first characteristics of the at least one point to the one or more second characteristics of the at least one point to monitor the powder layer distributed by the moving powder distributor.

2. The method of any preceding clause, wherein receiving the image data comprises receiving a radiation map corresponding to an amount of radiation emitted from the powder layer.

3. The method of any preceding clause, wherein receiving the image data comprises receiving a time stamp corresponding to a time at which the plurality of images of the powder layer were captured relative to movement of the moving powder distributor.

4. The method of any preceding clause, wherein receiving the image data comprises receiving leading image data from a first imaging device and receiving trailing image data from a second imaging device, the leading image data comprising the leading region of interest and the trailing image data comprising the trailing region of interest.

5. The method of any preceding clause, further comprising, prior to determining the leading region of interest, identifying, by the processing device, the moving powder distributor from the image data.

6. The method of any preceding clause, further comprising providing feedback to one or more components of the build chamber based on the comparing.

7. The method of any preceding clause, further comprising directing movement of the moving powder distributor based on the comparing.

8. The method of any preceding clause, further comprising determining one or more powder defects based on the comparing.

9. The method of any preceding clause, wherein the leading region of interest and the trailing region of interest are a portion of the field of view of the one or more imaging devices.

10. An additive manufacturing system, the additive manufacturing system comprising: a build chamber comprising a powder distributor and a powder bed, the powder bed supporting a powder layer thereon, the powder distributor movable over the powder bed to distribute the powder layer; an imaging device positioned adjacent to the build chamber such that a field of view of the imaging device encompasses the powder bed; and a control component communicatively coupled to the imaging device, the control component configured to receive image data from the imaging device, determine a leading region of interest adjacent to a leading end of the powder distributor and a trailing region of interest adjacent to a trailing end of the powder distributor in the image data, select at least one point on the powder bed that is within the leading region of interest, determine one or more first characteristics of the at least one point, determine one or more second characteristics of the at least one point when the powder distributor moves such that the at least one point is located within the trailing region of interest, and compare the one or more first characteristics with the one or more second characteristics to monitor the powder layer.

11. The additive manufacturing system of any preceding clause, wherein the imaging device is an area scan camera.

12. The additive manufacturing system of any preceding clause, wherein the area scan camera comprises a monochrome sensor.

13. The additive manufacturing system of any preceding clause, wherein the area scan camera comprises a color sensor and a Bayer filter.

14. The additive manufacturing system of any preceding clause, wherein the imaging device detects radiation reflected off the powder layer and the image data comprises a radiation map.

15. The additive manufacturing system of any preceding clause, wherein the control component is further configured to determine one or more defects of the powder layer based on the comparing.

16. An additive manufacturing system, the additive manufacturing system comprising: a build chamber comprising a powder distributor and a powder bed, the powder bed supporting a powder layer thereon, the powder distributor movable over the powder bed to distribute the powder layer; a dynamic optical element positioned adjacent to the build chamber; a plurality of imaging devices positioned adjacent to the build chamber and optically coupled to the dynamic optical element such that a field of view of a first imaging device of the plurality of imaging devices is directed towards a leading region of interest located adjacent to a leading end of the powder distributor and such that a field of view of a second imaging device of the plurality of imaging devices is directed towards a trailing region of interest located adjacent to a trailing end of the powder distributor; and a control component communicatively coupled to each of the plurality of imaging devices, the control component configured to receive image data from the plurality of imaging devices, select at least one point on the powder bed that is located within the leading region of interest, determine one or more first characteristics of the at least one point, determine one or more second characteristics of the at least one point when the powder distributor moves such that the at least one point is located within the trailing region of interest, and compare the one or more first characteristics with the one or more second characteristics to monitor the powder layer.

17. The additive manufacturing system of any preceding clause, wherein at least one of the plurality of imaging devices is a hyperspectral line scan camera.

18. The additive manufacturing system of any preceding clause, wherein the dynamic optical element comprises at least one of a rotating mirror, a MEMS mirror, a lens, and a prism.

19. The additive manufacturing system of any preceding clause, wherein the plurality of imaging devices detect radiation reflected off the powder layer and the image data comprises a radiation map.

20. The additive manufacturing system of any preceding clause, wherein the control component is further configured to determine one or more defects of the powder layer based on the comparing.

What is claimed is:

1. A method of monitoring a powder layer distributed by a moving powder distributor in a build chamber, the method comprising:
    receiving, by a processing device, image data corresponding to a plurality of images of the powder layer supported by a powder bed within the build chamber from one or more imaging devices positioned to image the powder bed;
    determining, by the processing device, a leading region of interest located adjacent to a leading end of the moving powder distributor, the leading region of interest moving according to movement of the moving powder distributor;
    determining, by the processing device, a trailing region of interest located adjacent to a trailing end of the moving powder distributor, the trailing region of interest moving according to the moving powder distributor;
    selecting, by the processing device, at least one point on the powder bed that is located in the leading region of interest from the image data;
    determining, by the processing device, one or more first characteristics of each of the at least one point;
    when any of each of the at least one point is located within the trailing region of interest due to movement of the moving powder distributor, determining, by the processing device, one or more second characteristics of each of the at least one point located in the trailing region;
    comparing, by the processing device, the one or more first characteristics of each of the at least one point to the one or more second characteristics of each of the at least one point to monitor the powder layer distributed by the moving powder distributor; and
    directing movement of the moving powder distributor based on the comparing.

2. The method of claim 1, wherein receiving the image data comprises receiving a radiation map corresponding to an amount of radiation emitted from the powder layer.

3. The method of claim 1, wherein receiving the image data comprises receiving a time stamp corresponding to a time at which the plurality of images of the powder layer were captured relative to movement of the moving powder distributor.

4. The method of claim 1, wherein receiving the image data comprises receiving leading image data from a first imaging device and receiving trailing image data from a second imaging device, the leading image data comprising the leading region of interest and the trailing image data comprising the trailing region of interest.

5. The method of claim 1, further comprising, prior to determining the leading region of interest, identifying, by the processing device, the moving powder distributor from the image data.

6. The method of claim 1, further comprising providing feedback to one or more components of the build chamber based on the comparing.

7. The method of claim 1, further comprising determining one or more powder defects based on the comparing.

8. The method of claim 1, wherein the leading region of interest and the trailing region of interest are a portion of the field of view of the one or more imaging devices.

* * * * *